(12) United States Patent
Na

(10) Patent No.: US 9,189,395 B2
(45) Date of Patent: Nov. 17, 2015

(54) METHOD AND APPARATUS FOR ADJUSTABLE VIRTUAL ADDRESSING FOR DATA STORAGE

(75) Inventor: Se Wook Na, Suwon-si (KR)

(73) Assignee: Seagate Technology LLC, Cupertino, CA (US)

(*) Notice: Subject to any disclaimer, the term of this patent is extended or adjusted under 35 U.S.C. 154(b) by 322 days.

(21) Appl. No.: 13/459,047

(22) Filed: Apr. 27, 2012

(65) Prior Publication Data

US 2013/0290668 A1    Oct. 31, 2013

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC .......... *G06F 12/08* (2013.01); *G06F 2212/657* (2013.01)

(58) Field of Classification Search
CPC .......... G11B 5/012; G11B 2220/2516; G11B 2020/1238; G11B 2020/1292; G11B 5/596; G06F 3/0674
USPC .................. 711/202, 203, 206, 221
See application file for complete search history.

(56) References Cited

U.S. PATENT DOCUMENTS

| | | | |
|---|---|---|---|
| 7,440,221 B2 | 10/2008 | Tsuchinaga | |
| 7,603,530 B1* | 10/2009 | Liikanen et al. | 711/162 |
| 7,982,994 B1 | 7/2011 | Erden | |
| 8,179,627 B2 | 5/2012 | Chang | |
| 8,270,256 B1 | 9/2012 | Juang | |
| 2002/0118476 A1* | 8/2002 | Malone, Sr. | 360/48 |
| 2006/0232874 A1* | 10/2006 | Tsuchinaga et al. | 360/75 |
| 2007/0030588 A1 | 2/2007 | Tsuchinaga | |
| 2010/0325384 A1* | 12/2010 | Ryu et al. | 711/209 |
| 2011/0085266 A1 | 4/2011 | Kanai | |
| 2011/0222186 A1 | 9/2011 | Itakura | |
| 2011/0292545 A1 | 12/2011 | Katada | |
| 2012/0060073 A1 | 3/2012 | Itakura | |
| 2012/0069466 A1 | 3/2012 | Okamoto | |

(Continued)

OTHER PUBLICATIONS

Garth Gibson, Directions for Shingled-Write and Two-Dimensional Magnetic Recording System Architectures: Synergies with Solid-State Disks, Carnegie Mellon University, May 2009,pp. 1-2, Pittsburgh, US.

*Primary Examiner* — Charles Rones
*Assistant Examiner* — Sidney Li
(74) *Attorney, Agent, or Firm* — Cesari & Reed LLP; Kirk A. Cesari; Christian W. Best

(57) ABSTRACT

Methods and apparatuses for adjusting the size of a virtual band or virtual zone of a storage medium are provided. In one embodiment, an apparatus may comprise a data storage device including a data storage medium having a physical zone; and a processor configured to receive a virtual addressing adjustment command, and adjust a number of virtual addresses in a virtual band mapped to the physical zone based on the virtual addressing adjustment command. In another embodiment, a method may comprise providing a data storage device configured to implement virtual addresses associated with a virtual band mapped to a physical zone of a data storage medium of the data storage device, receiving at the data storage device a virtual addressing adjustment command, and adjusting a number of virtual addresses in a virtual band based on the virtual addressing adjustment command.

20 Claims, 24 Drawing Sheets

(56) References Cited

U.S. PATENT DOCUMENTS

2012/0082019 A1 4/2012 Harigae
2012/0099216 A1 4/2012 Grobis
2012/0162808 A1 6/2012 Masuda
2012/0194937 A1 8/2012 Tagami

* cited by examiner

| SN0 | SN1 | SN2 | SN3 | SN4 | Track 1 |
| 7 | 2 | 14 | 4 | 9 | |
| SN5 | SN6 | SN7 | SN8 | SN9 | Track 2 |
| 5 | 3 | 12 | 8 | | |
| SN10 | SN11 | SN12 | SN13 | SN14 | Track 3 |

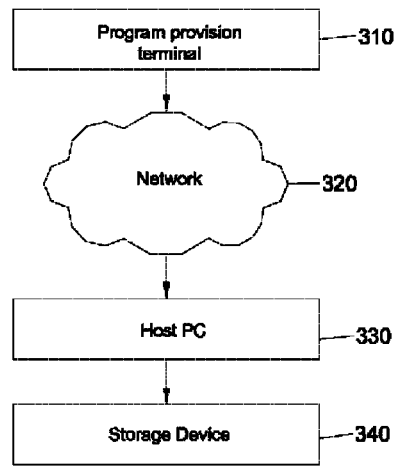

METHOD AND APPARATUS FOR ADJUSTABLE VIRTUAL ADDRESSING FOR DATA STORAGE

BACKGROUND OF THE INVENTION

1. Field of the Invention

The present invention relates to a method and apparatus for accessing a storage medium, and more particularly, to a method and apparatus for accessing a storage medium using a virtual address.

2. Background of the Invention

A disk drive is a type of storage device that contributes to the operation of a computer system by writing or reading data on or from a storage medium in response to a command issued from a host machine. A variety of writing methods are being studied in order to improve the recording density of the disk drive. Moreover, there is a demand for a new storage medium accessing method suitable for a new writing method for increasing recording density.

SUMMARY OF THE INVENTION

In one embodiment, an apparatus may comprise a data storage device including a data storage medium having at least one physical zone; and a processor configured to receive a virtual addressing adjustment command, and adjust a number of virtual addresses in at least one virtual band mapped to the at least one physical zone based on a first parameter of the virtual addressing adjustment command.

In another embodiment, a method may comprise providing a data storage device configured to implement virtual addresses associated with a virtual band mapped to at least one physical zone of a data storage medium of the data storage device, receiving at the data storage device a virtual addressing adjustment command, and adjusting a number of virtual addresses in at least one virtual band based on a first parameter of the virtual addressing adjustment command.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 31 is a view showing a mapping structure for a virtual band when shingle written data of LBAs 2 and 3 is updated as show in FIG. 30;

FIG. 32 is a view showing a mapping structure for a virtual band before and after a garbage collection process;

FIG. 33 is a view showing the network configuration for explaining a method for adjusting the parameters of a storage device over a network according to an embodiment of the inventive concept.

DETAILED DESCRIPTION OF THE INVENTION

Figure 1A:
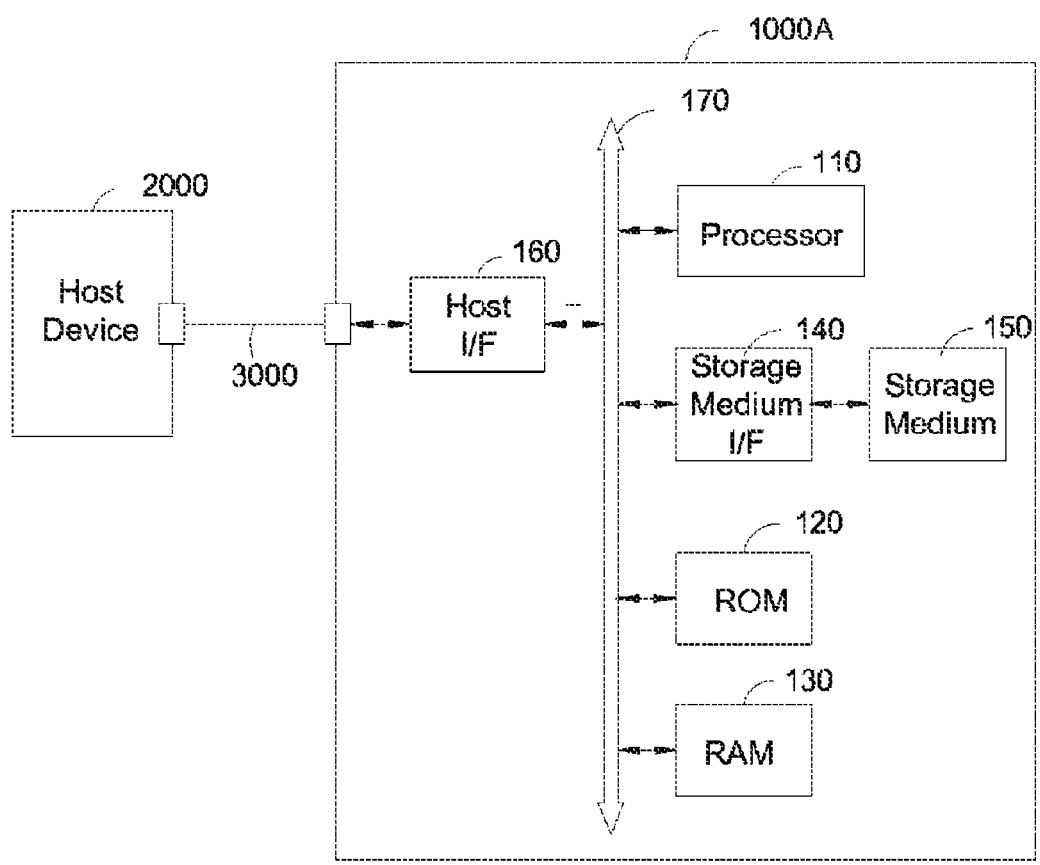
FIG. 1A is a block diagram of a computer system according to an embodiment of the inventive concept.

An aspect of the invention is to provide a computer system for adjusting the size of a virtual zone or virtual band for a storage medium. Another aspect of the invention is to provide a storage device parameter adjustment method for adjusting the parameter value to determine the size of a virtual zone or virtual band.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. Throughout the attached drawings, like reference numerals denote like elements.

Hereinafter, an exemplary embodiment of the present invention will be described in detail with reference to the accompanying drawings.

As shown in FIG. 1a, a computer system according to an embodiment of the inventive concept includes a storage device 1000A, a host device 2000, and a connector 3000.

More specifically, the storage device 1000A includes a processor 110, a ROM 120, a RAM 130, a storage medium interface (storage medium I/F) 140, a storage medium 150, a host interface (host I/F) 160, and a bus 170.

The host device 2000 performs a process of issuing a command for operating the storage device 1000A, transmitting it to the storage device 1000A connected via the connector 3000, and transmitting or receiving data to or from the storage device 1000A in response to the issued command.

The connector 3000 is means for electrically connecting an interface port of the host device 2000 and an interface port of the storage device 1000A, and includes a data connector and a power connector. For example, when a Serial Advanced Technology Attachment (SATA) I/F is used, the connector 3000 may include a 7-pin SATA data connector and a 15-pin SATA power connector.

First of all, the components of the storage device 1000A will be described.

The processor 110 interprets commands and controls the components of the storage device 1000A according to the interpretation results. The processor 110 may include a code object management unit, and may load a code object stored in the storage medium 150 to the RAM 130 using the code object management unit. The processor 110 loads code objects in the RAM 130 for executing a storage medium accessing method according to the flowcharts of FIGS. 17 to 29 and a storage device parameter adjustment method according to the flowchart of FIG. 34.

Figure 34:
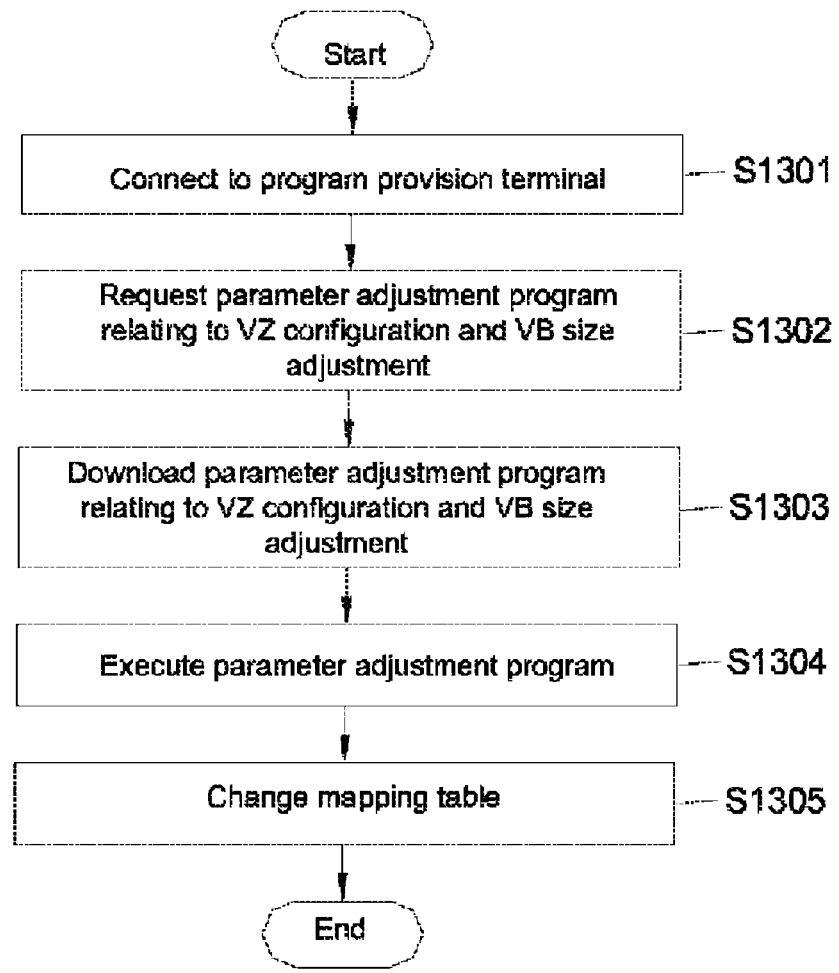
FIG. 34 is a flowchart of a method for adjusting the parameters of a storage device to configure a virtual zone and adjust a virtual band size for a storage medium over a network according to an embodiment of the inventive concept.

The processor 110 then executes a task for the storage medium access method according to the flowcharts of FIGS. 17 to 29 and the storage device parameter adjustment method according to the flowchart of FIG. 34 by using the code objects loaded in the RAM 130. The storage medium access method, data writing method, and storage device parameter adjustment method executed by the processor 110 will be discussed in detail with reference to FIGS. 17 to 29 and FIG. 34 below.

The ROM stores program codes and data necessary for operating the storage device 1000A.

The program codes and data stored in the ROM 120 and/or the storage medium 150 are loaded in the RAM 130 under control of the processor 110.

The storage medium 150 is a main storage medium of the storage device, and may include a disk or a non-volatile semiconductor memory device, for example. The storage device 1000A may thus include a disk drive, for example, and a detailed structure of a head disk assembly 100, including a disk and a head in the disk drive, is shown in FIG. 3.

Figure 3:
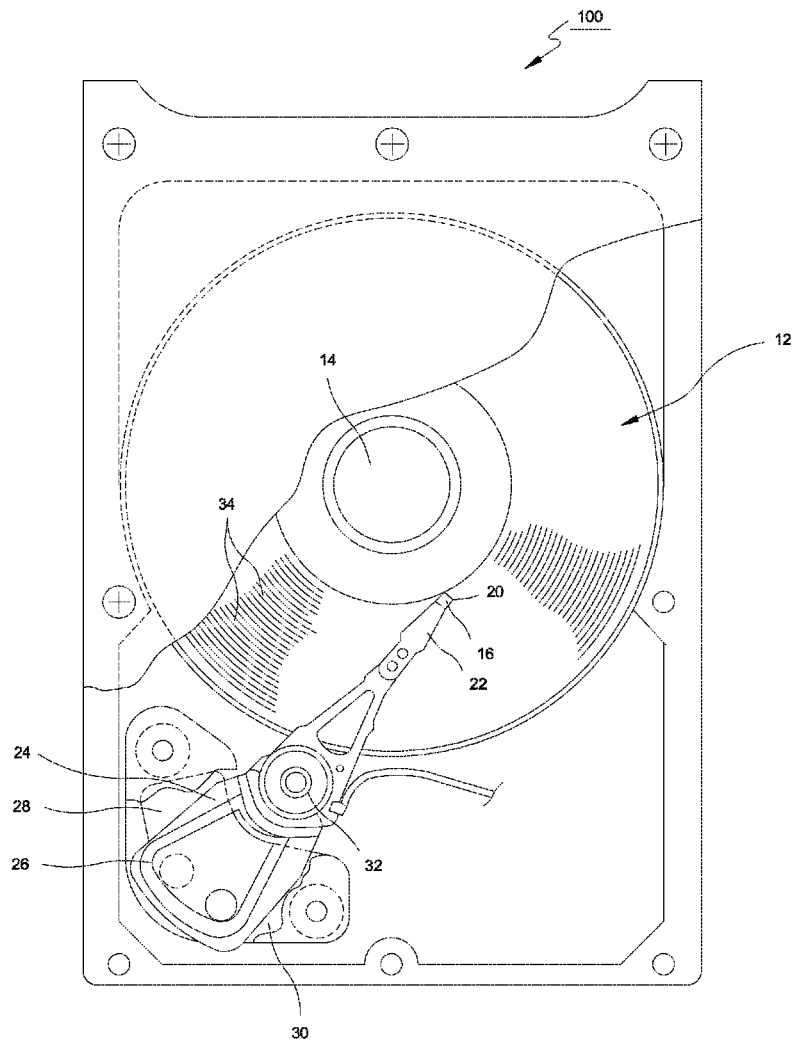
FIG. 3 is a top plan view of a head disk assembly of a disk drive according to an embodiment of the inventive concept.

Referring to FIG. 3, the head disk assembly 100 includes at least one disk 12 rotated by a spindle motor 14. The disk drive may also include a head 16 positioned adjacent to a surface of the disk 12.

The head 16 senses and magnetizes a magnetic field of each disk 12, thereby reading information from or writing information to the rotating disk 12. Typically, the head 16 is coupled to a surface of each disk 12. Although a single head 16 is illustrated, the head 16 needs to be regarded as including a write head for magnetizing the disk 12 and a separate read head for sensing the magnetic field of the disk 12. The read head may include a magneto-resistive (MR) element. The head 16 may be referred to as a magnetic head or a head.

The head 16 may be incorporated into a slider 20. The slider 20 is configured to generate an air bearing between the head 16 and the surface of the disk 12. The slider 20 is coupled to a head gimbal assembly 22 that is attached to an actuator arm 24 having a voice coil 26. The voice coil 26 is positioned adjacent to a magnetic assembly 28 so as to define a Voice Coil Motor (VCM) 30. A current provided to the voice coil 26 generates a torque which rotates the actuator arm 24 with respect to a bearing assembly 32. The rotation of the actuator arm 24 moves the head 16 across the surface of the disk 12.

Information is usually stored in ring-shaped tracks 34 of the disk 12. Each track 34 generally includes multiple sectors. A sector structure of a track is illustrated in FIG. 5.

Figure 5:
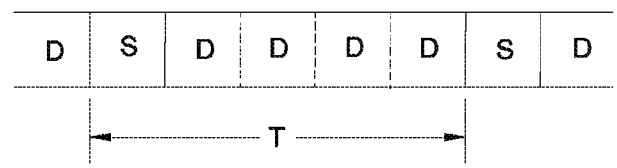
FIG. 5 is a view showing a sector structure of a track of a disk as a storage medium applied to the present invention.

As shown in FIG. 5, one servo sector T includes a servo information field S and a data field. The data field may include a plurality of data sectors D. Of course, one servo sector may include a single data sector D. The data sector D will be referred to as a sector.

Figure 6:
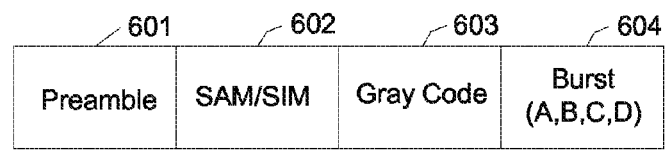
FIG. 6 is a view showing a structure of a servo information field shown in FIG. 5.

Also, signals as illustrated in FIG. 6 are recorded to the servo information field S.

As shown in FIG. 6, a preamble 601, a servo synchronization indication signal 602, a gray code 603, and a burst signal 604 are written to the servo information field S.

The preamble 601 provides clock synchronization when reading servo information, and provides a predetermined timing margin by setting a gap before the servo sector. Also, the preamble 601 is used to determine a gain (not shown) of an automatic gain control (AGC) circuit.

The servo synchronization indication signal 602 consists of a servo address mark (SAM) and a servo index mark (SIM). The servo address mark is a signal that indicates a start of a sector, and the servo index mark is a signal that indicates a start of a first servo sector in a track.

The gray code 603 provides track information, and the burst signal 604 is used to control the head 16 to follow the center of the track 34. For example, the burst signal may include four patterns A, B, C, and D, and four burst patterns are combined to generate a position error signal used to control track following.

The disk 12 is divided into a maintenance cylinder area, which is inaccessible to a user, and a user data area, which is accessible to the user. The maintenance cylinder area may be referred to as a system area. Various information required to control the disk drive is stored in the maintenance cylinder area, as well as information required to perform the storage medium accessing method, data writing method, and storage device parameter adjustment method according to the present invention. Particularly, the maintenance cylinder area stores a mapping table for converting a logical block address LBA into a virtual address VA based on a virtual zone or virtual band.

The head 16 moves across the surfaces of the disk 12 in order to read or write information in different tracks. A plurality of code objects used to realize various functions of the disk drive may be stored in the disk 12. For example, a code object for executing an MP3 player function, a code object for executing a navigation function, a code object for executing various video games, and the like, may be stored in the disk 12.

Referring again to FIG. 1A, the storage medium interface 140 is an element that enables the processor 110 to access the storage medium 150 in order to write and read information. In detail, the storage medium interface 140 in the storage device that is implemented as a disk drive includes a servo circuit controlling the head disk assembly 100 and a read/write channel circuit performing signal processing for data reading/writing.

The host interface 160 performs data transmission/reception to/from the host device 2000 such as a personal computer, a mobile device, etc., and may be an interface having various sizes, such as a serial advanced technology attachment (SATA) interface, a parallel advanced technology attachment (PATA) interface, or a universal serial bus (USB) interface.

The bus 170 transfers information between the elements of the storage device.

Next, a software operation system of a hard disk drive, which is an example of the storage device, will be described with reference to FIG. 2.

Figure 2:
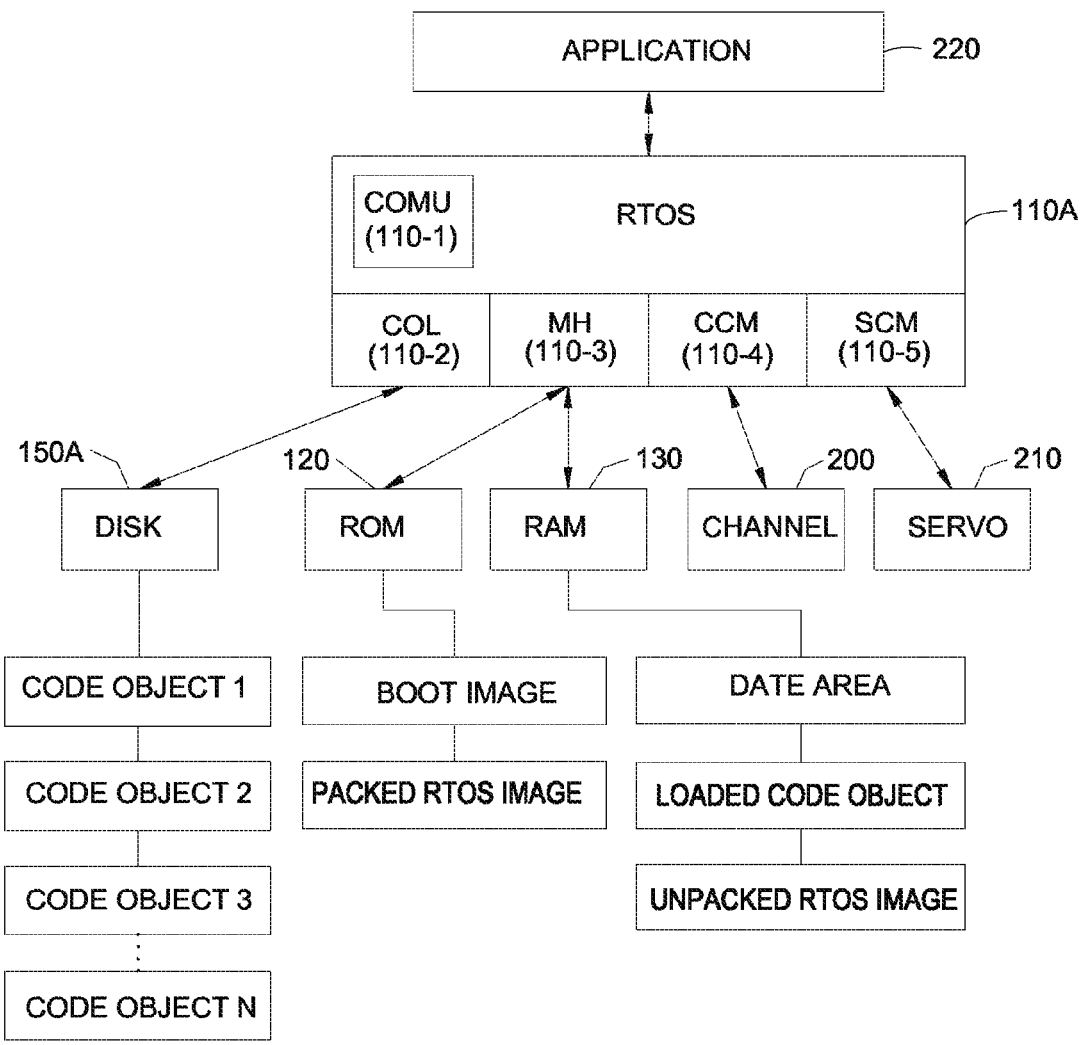
FIG. 2 is a diagram illustrating a software operation system of a storage device according to an embodiment of the inventive concept.

As shown in FIG. 2, a plurality of code objects 1 through N are stored in a disk 150A, which is a storage medium of the hard disk drive (HDD).

The ROM 120 stores a boot image and a packed real time operating system (RTOS) image.

The plurality of code objects 1 through N are stored in the disk 150A. The code objects stored in the disk may include not only code objects required for operating the disk drive but also code objects related to various functions that may be extended to the disk drive. In particular, code objects for executing the storage medium accessing method according to the flowchart of FIGS. 17 to 29 and the storage device parameter adjustment method according to the flowchart of FIG. 34 are stored in the disk 150A. Obviously, the code objects for executing the methods according to the flowcharts of FIGS. 17 to 29 and FIG. 34 may also be stored in the ROM 120 instead of the disk 150A. Also, code objects performing various functions such as a MP3 player function, a navigation function, a video game function, or the like may also be stored in the disk 150A.

The RAM 130 reads the boot image from the ROM 120 while booting the disk drive, and an unpacked RTOS image is loaded to the RAM 130. Also, code objects required to operate a host interface stored in the disk 150A are loaded to the RAM 130. Obviously, a data area for storing data is also allocated in the RAM 130.

Circuits that are required to perform signal processing for data reading/writing are included in a channel circuit 200, and circuits required for controlling the head disk assembly 100 for performing data reading/writing operations are included in a servo circuit 210.

An RTOS 110A is a real time operating system program and is a multi-program operating system using a disk. In the RTOS 110A, real time multi-processing is performed as a foreground process having high priority, and batch processing is performed as a background process having low priority according to a task. Also, the RTOS 110A loads code objects from the disk and unloads code objects onto the disk.

The RTOS 110A manages a code object management unit (COMU) 110-1, a code object loader (COL) 110-2, a memory handler (MH) 110-3, a channel control module (CCM) 110-4, and a servo control module (SCM) 110-5 to perform tasks according to requested commands. The RTOS 110A also manages application programs 220.

In detail, the RTOS 110A loads code objects required for controlling the disk drive to the RAM 130 when booting the disk drive. Accordingly, after the booting is executed, the disk drive may be operated by using code objects loaded to the RAM 130.

The COMU 110-1 stores location information regarding locations to which code objects are written, and arbitrates a bus. Also, the COMU 110-1 stores information regarding priorities of performed tasks. In addition, the COMU 110-1 manages task control block (TCB) information required to execute tasks for code objects, and stack information.

The COL 110-2 loads the code objects stored in the disk 150A to the RAM 130 using the COMU 110-1 and unloads the code objects stored in the RAM 130 to the disk 150A. Accordingly, the COL 110-2 may load the code objects stored in the disk 150A used to execute the methods according to the flowcharts of FIGS. 17 through 29 and FIG. 34 to the RAM 130.

The RTOS 110A may execute the methods according to the flowcharts of FIGS. 17 through 29 and FIG. 34, which will be described below, by using the code objects loaded to the RAM 130.

The MH 110-3 performs writing or reading data to/from the ROM 120 and the RAM 130.

The CCM 110-4 performs channel controlling required for performing signal processing for data reading/writing, and the SCM 110-5 performs servo controlling including the head disk assembly for performing data reading/writing.

Figure 1B:
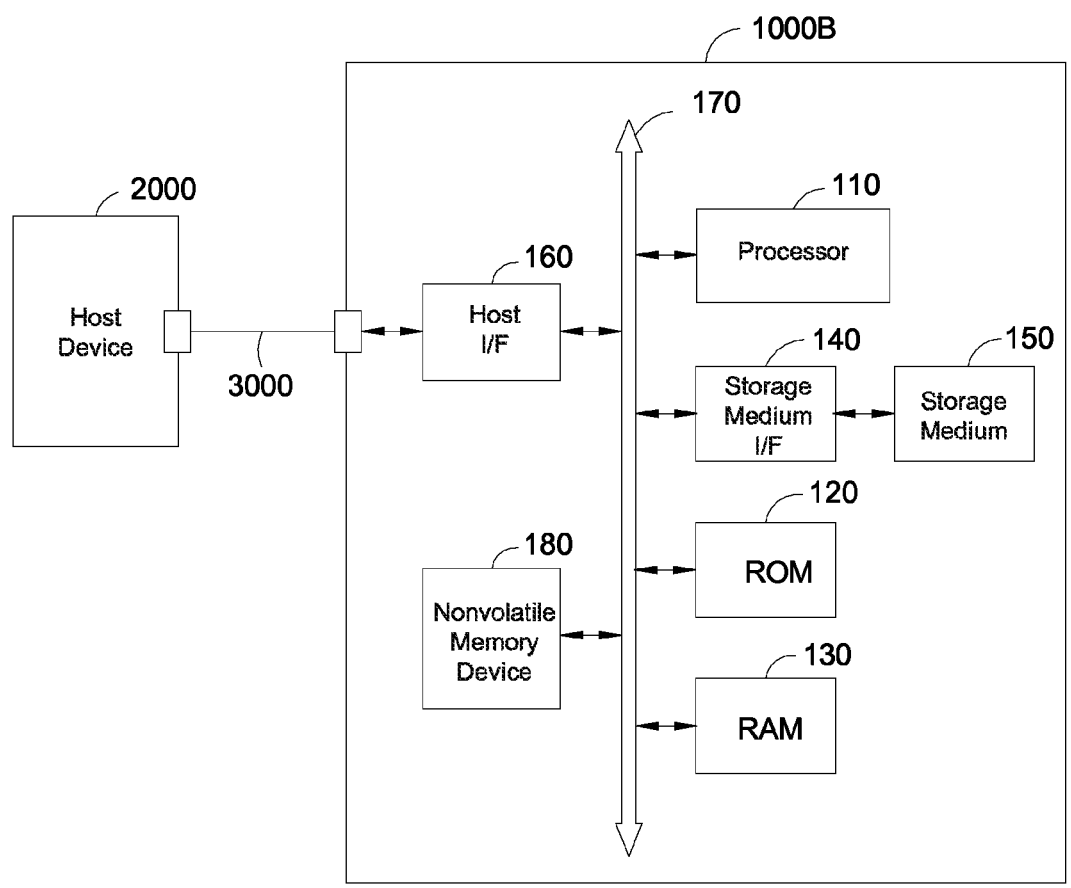
FIG. 1B is a block diagram of a computer system according to another embodiment of the inventive concept.

Next, FIG. 1B shows a block diagram of a computer system according to another embodiment of the inventive concept.

A storage device 1000B of the computer system shown in FIG. 1B further includes a nonvolatile memory device 180, in addition to the elements of storage device 1000A shown in FIG. 1A. The storage medium 150 in FIG. 1B may be implemented as a disk.

The nonvolatile memory device 180 may be implemented as a nonvolatile semiconductor memory device. For example, the nonvolatile memory device 180 may be a flash memory, a phase change RAM (PRAM), a ferroelectric RAM (FRAM), or a magnetic RAM (MRAM).

The nonvolatile memory device 180 may store some or all of the data to be stored in the storage device 1000B. For example, various information required for controlling the storage device 1000B may be stored in the nonvolatile memory device 180.

Also, the nonvolatile memory device 180 may store program codes and information for executing the methods according to the flowcharts of FIGS. 17 through 29 and FIG. 34. Concretely, a mapping table for converting a logical block address into a virtual address based on a virtual zone or virtual band may be stored in the nonvolatile memory device 180. If the mapping table is stored in the nonvolatile memory device 180, the storage device is stored in the nonvolatile memory device 180 to load the mapping table to the RAM 130.

Repetitive descriptions of the same elements described previously described for the computer system of FIG. 1A will be omitted.

Figure 4A:
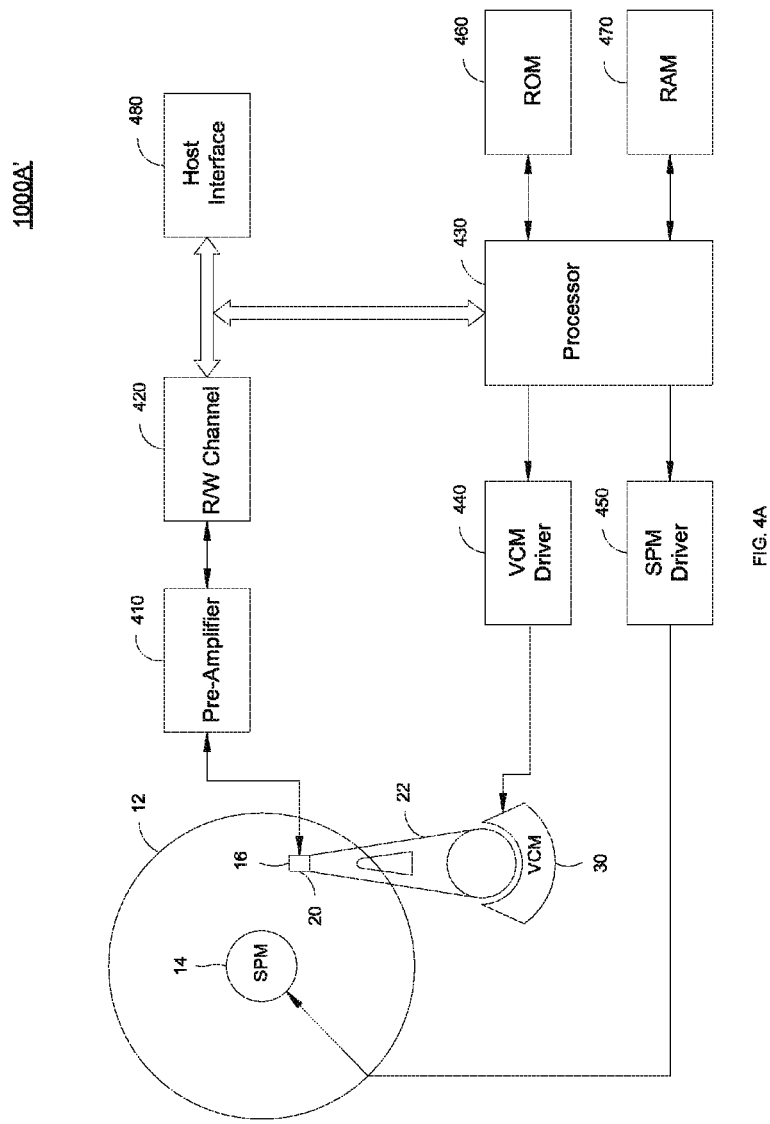
FIG. 4A is a view showing an electrical circuit configuration of a disk drive according to an embodiment of the inventive concept.

Next, FIG. 4A illustrates an electrical circuit configuration of a disk drive 1000A' as an example of the storage device shown in FIG. 1A according to an embodiment of the inventive concept.

As shown in FIG. 4A, a disk drive 1000A', according to an embodiment of the inventive concept includes a pre-amplifier 410, a Read/Write (R/W) channel 420, a processor 430, a Voice Coil Motor (VCM) driver 440, a Spindle Motor (SPM) driver 450, an ROM 460, a RAM 470, and a host interface 480.

The processor 430 may be a Digital Signal Processor (DSP), a microprocessor, a microcontroller, or the like. The processor 430 controls the R/W channel 420 to read information from the disk 12 or write information to the disk 12 according to a command received from the host device 2000 through the host interface 480.

The processor 430 is coupled to the VCM driver 440 which provides a driving current for driving the VCM 30. The processor 430 provides a control signal to the VCM driver 440 to control motion of the head 16.

The processor 430 is coupled to the SPM driver 450, which provides a driving current for driving a spindle motor (SPM) 14. The processor 430, upon being supplied with power, provides a control signal to the SPM driver 450 to rotate the SPM 14 at a target speed.

The processor 430 is also coupled to the ROM 460 and the RAM 470. The ROM 460 stores firmware and control data for controlling the disk drive. The ROM 460 also stores program codes and information for executing the methods according to the flowcharts of FIGS. 17 through 29 and FIG. 34. Alternatively, the program codes and information for executing the methods according to the flowcharts of FIGS. 17 through 29 and FIG. 34 may be stored in the maintenance cylinder area of the disk 12, instead of the ROM 460.

The RAM 470 loads the program codes stored in the ROM 460 or the disk 12 in an initialization mode under the control of the processor 430, and temporarily stores data received through the host interface 480 or data read from the disk 12.

The RAM 470 may be implemented by a Dynamic Random Access Memory (DRAM) or a Synchronous Random Access Memory (SRAM). The RAM 470 may be designed to operate in a Single Data Rate (SDR) or Double Data Rate (DDR) scheme.

The processor 430 may control the disk driver so as to execute the methods according to the flowcharts of FIGS. 17 through 29 and FIG. 34 using program codes and information stored in the ROM 460 or the maintenance cylinder area of the disk 12.

Figure 4B:
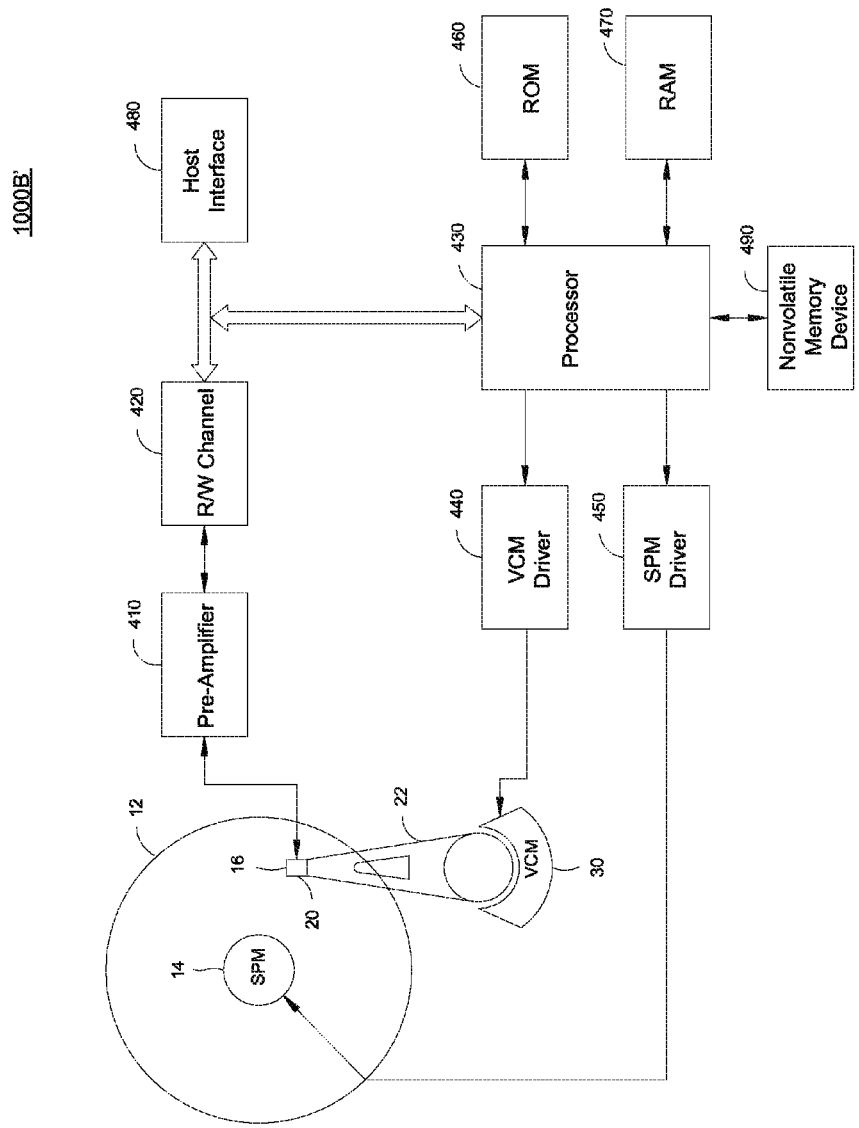
FIG. 4B is a view showing an electrical circuit configuration of a disk drive according to another embodiment of the inventive concept.

Next, FIG. 4B illustrates an electrical circuit configuration of a disk drive 1000B' as an example of the storage device shown in FIG. 1B according to an embodiment of the inventive concept.

The disk drive 1000B' shown in FIG. 4B further includes a nonvolatile memory device 490, in addition to the elements of disk drive 1000A' shown in FIG. 4A. The nonvolatile memory device 490 may store some of the data to be stored in the disk drive 1000B'. For example, various information required for controlling the disk drive 1000B' may be stored in the nonvolatile memory device 490.

Also, the nonvolatile memory device 490 may store program codes and information for executing the methods according to the flowcharts of FIGS. 17 through 29 and FIG. 34. Concretely, a mapping table for converting a logical block address into a virtual address based on a virtual zone or virtual band may be stored in the nonvolatile memory device 490.

The processor 430 is also coupled to the ROM 460, the RAM 470, and the nonvolatile memory device 490. The ROM 460 stores firmware and control data for controlling the disk drive. The ROM 460 also stores program codes and information for executing the methods according to the flowcharts of FIGS. 17 through 29 and FIG. 34. Alternatively, the program codes and information for executing the methods according to the flowcharts of FIGS. 17 through 29 and FIG. 34 may be stored in the maintenance cylinder area of the disk 12 or in the nonvolatile memory device 490, instead of the ROM 460.

The RAM 470 loads the program codes stored in the ROM 460, the disk 12, or the nonvolatile memory device 490 in an initialization mode under the control of the processor 430.

Repetitive descriptions of the same elements described previously described for the disk drive 1000A' of FIG. 4A will be omitted.

Next, data read and write operations of the disk drive will be described with reference to FIG. 4A or FIG. 4B.

In the data read mode, the disk drive amplifies an electrical signal sensed by the head 16 from the disk 12 through the pre-amplifier 410. Thereafter, in the R/W channel 420, a signal output from the pre-amplifier 410 is amplified by an automatic gain control circuit (not shown), which automatically varies a gain according to an amplitude of the signal. The amplified signal is converted into a digital signal, and then the digital signal is decoded, thereby detecting data. An error correction process is performed on the detected data by using a Reed Solomon (RS) code as an error correction code at the processor 430. Then error corrected data is converted into stream data for transmission to the host device 2000 through the host interface 480.

In the data write mode, the disk drive receives data from the host device 2000 through the host interface 480, and adds an error correction symbol based on the RS code to the data through the processor 430. The disk drive suitably performs coding for a writing channel through the R/W channel 420, and then writes the data in the disk 12 through the head 16 with a writing current amplified by the pre-amplifier 410.

Now, an operation for the processor 430 to execute the methods according to the flowcharts of FIGS. 17 through 29 and FIG. 34 by using the program codes and information loaded to the RAM 470 will be described.

First of all, a shingle write method, which is a new writing method, suggested to increase the recording density of the disk drive, which is a type of storage device according to the present invention, will be described.

Figure 7:
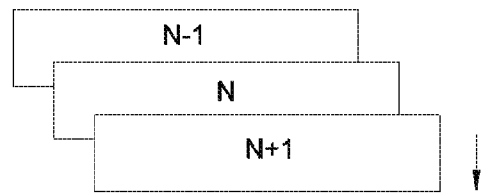
FIG. 7 conceptually illustrates the configuration of tracks caused by a flux generated in a shingle write method according to an embodiment of the inventive concept.

The shingle write method is a writing method in which data is written only in one direction as tracks on a disk are overwritten as if shingles are stacked. That is, as shown in FIG. 7, in the shingle write method, assuming that data is written only in the arrow direction, an (N−1)th track is partially overwritten when an Nth track adjacent to the (N−1)th track is written, and the Nth track is partially overwritten when the (N+1)th track adjacent to the Nth track is written, thereby increasing the TPI (Track Per Inch) characteristic, which is the radial recording density of a storage medium.

Figure 8:
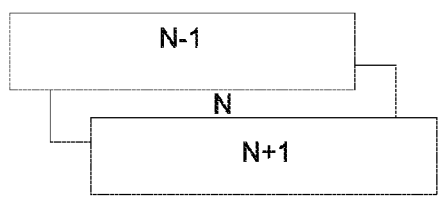
FIG. 8 conceptually illustrates the configuration of tracks caused by an adjacent track interference phenomenon in a shingle write method according to an embodiment of the inventive concept.

The shingle write method has to satisfy the restriction that the (N−1)th track cannot be written after writing the Nth track because a flux is always generated only in one direction. As shown in FIG. 8, if the (N−1)th track in the direction opposite to the shingle write direction is written after writing the Nth track, the Nth track is erased due to an adjacent track interference (ATI) effect.

Accordingly, to solve this problem, there is a need for a technique of dynamically allocating a new disk address for a logical block address (LBA) provided from a host so as to always perform writing only in either one of the inner and outer circumferential directions of the disk.

The present invention provides a disk accessing method, which uses an existing LBA as it is by using a virtual address in the process of converting the existing LBA into a cylinder head sector (CHS), i.e., a physical address of a disk drive, and satisfies the condition that the shingle write direction in the disk drive is limited to only one direction.

Figure 9:
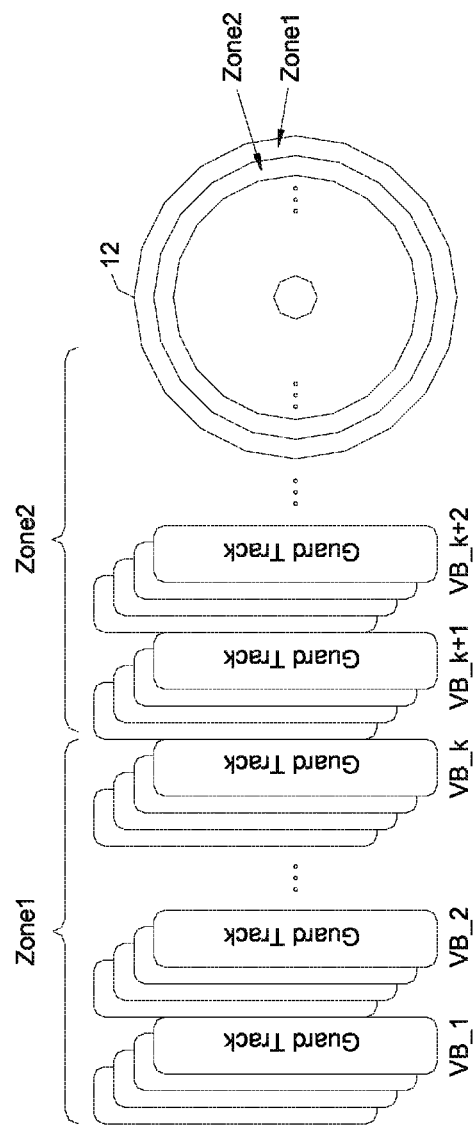
FIG. 9 is a view illustrating the configurations of physical zones and virtual bands for a storage medium according to an embodiment of the inventive concept.

Referring to FIG. 9, the configurations of a zone and virtual bands for realizing the accessing method suggested in the present invention will be described.

A storage area of the disk 12 is divided into a plurality of physical zones. The TPI (tracks per inch), i.e., recording density, and BPI (bits per inch) for each physical zone may be differently set. Each physical zone includes a plurality of virtual bands, and each virtual band is defined as a set of consecutive M tracks to be overwritten. Also, a guard track is arranged between the virtual bands to avoid overwriting between the virtual bands. Referring to FIG. 9, K virtual bands VB_1 to VB_K are arranged in physical zone 1. That is, a virtual band is defined as a segment of a unit size of a physical storage space of a storage medium.

Next, the structure of allocating logical bands and virtual bands for each zone will be described with reference to FIG. 10.

Figure 10:
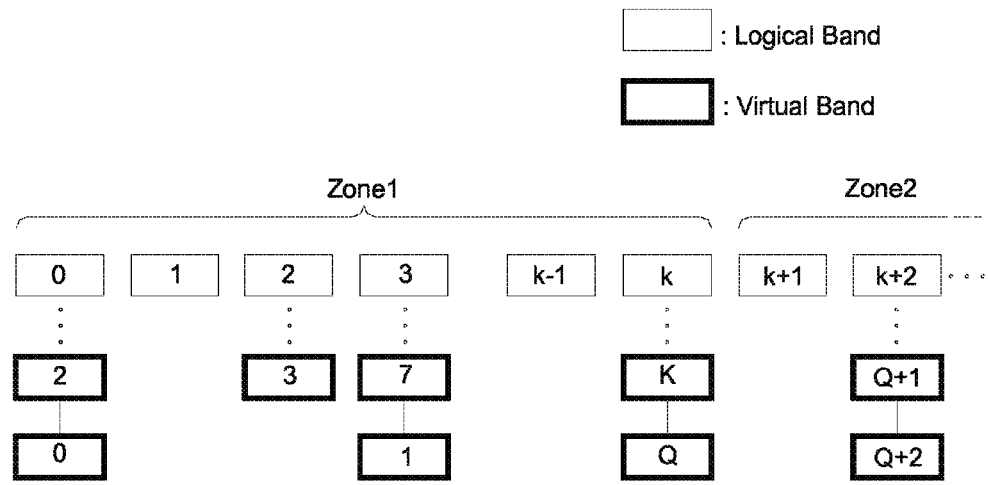
FIG. 10 is a view illustrating the structure of virtual bands allocated to logical bands for each physical zone of a storage medium according to an embodiment of the inventive concept.

FIG. 10 is a view schematically showing the structure of allocating virtual bands VB to logical bands LB for each physical zone of a storage medium according to an embodiment of the inventive concept.

As shown in FIG. 10, virtual bands are allocated to logical bands in order to perform an actual writing operation in a physical zone of a storage medium. Physical zone 1 of the storage medium may consist of K logical bands. A logical band is defined as a set of consecutive logical block addresses in units of a first size. That is, a logical band refers to a set of consecutive writable logical block addresses.

For example, assuming that the range of logical block addresses of physical zone 1 consists of 1,000 LBAs of 0 through 999, and each of the logical bands belonging to physical zone 1 is defined as a set of 100 LBAs, the number of logical bands included in physical zone 1 is 10. That is, K=10.

The number of virtual bands is set to Q (Q>K), which is more than the number of logical bands. The virtual bands are defined as the segments of the physical storage device of the storage in units of a second size. That is, if the storage medium is a disk, a virtual band is defined as a set of M tracks to be overwritten.

Virtual bands not allocated to logical bands may be referred to as reserved virtual bands. In other words, storage areas corresponding to the virtual bands not allocated to the logical bands may be referred to as reserved areas. Reserved virtual band information is stored in a free queue to be explained in FIG. 13 below.

Now, an operation for a storage device to perform access by using a logical band will be described.

Figure 11:
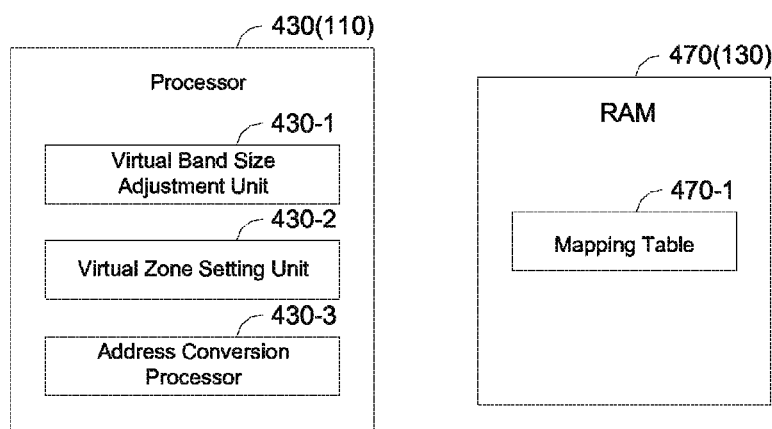
FIG. 11 is a detailed block diagram of the processor and RAM of a storage device according to an embodiment of the inventive concept.

FIG. 11 shows a detailed block diagram of the processor 110 and RAM 130 of the storage device illustrated in FIGS. 1A and 1B or the processor 430 and RAM 470 of the disk drive illustrated in FIGS. 4A and 4B according to an embodiment of the inventive concept. For convenience of description, FIG. 11 will be explained with reference to the disk drive of FIGS. 4A and 4B.

As shown in FIG. 11, the processor 430 includes a virtual band size adjustment unit 430-1, a virtual zone setting unit 430-2, and an address conversion processor 430-3. A mapping table 470-1 is loaded to the RAM 470.

The mapping table 470-1 may be loaded from the ROM 460, the disk 12, or the nonvolatile memory device 490. The mapping table 470-1 is defined as being capable of searching a virtual address based on LBA. The virtual address may be defined based on the physical address of a storage medium. If the storage medium is a disk, the virtual address may be defined based on the physical address of a sector. Moreover, the virtual address of the disk may be defined based on CHS (Cylinder Header Sector). Besides, the virtual address of the disk may be defined based on a virtual zone or physical zone, a virtual band, a track, and a sector.

If no virtual zone is set, the mapping table 470-1 may include information representing the allocation structure of logical bands and virtual bands for each physical zone. That is, the mapping table 470-1 may include information representing the mapping structure of virtual bands allocated to logical bands for each physical zone as shown in FIG. 10.

Figure 15:
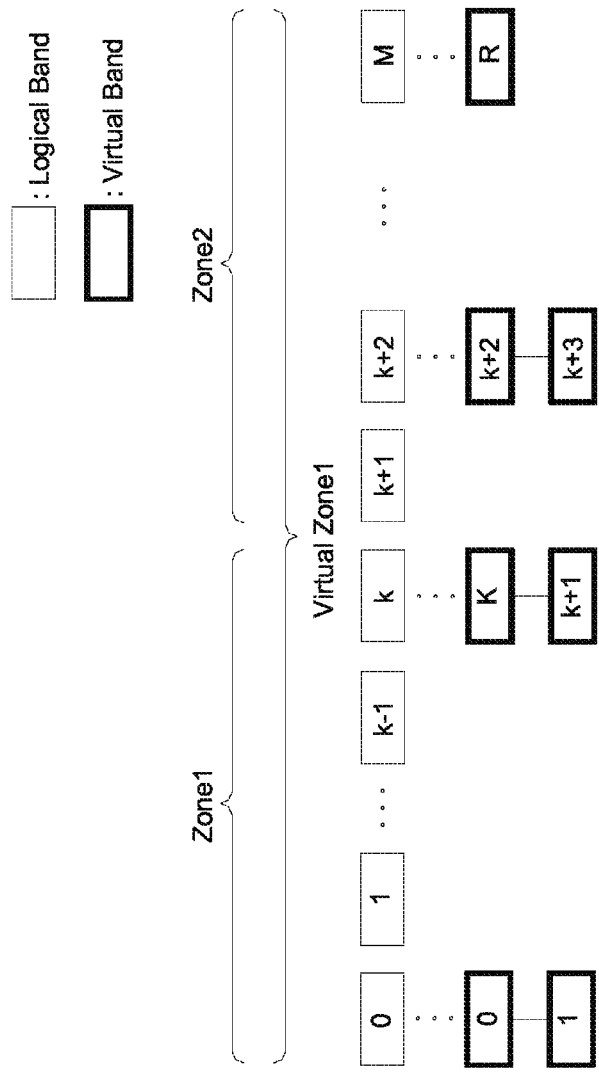
FIG. 15 is a view illustrating an example of the configuration of a virtual zone according to an embodiment of the inventive concept.
Figure 16:
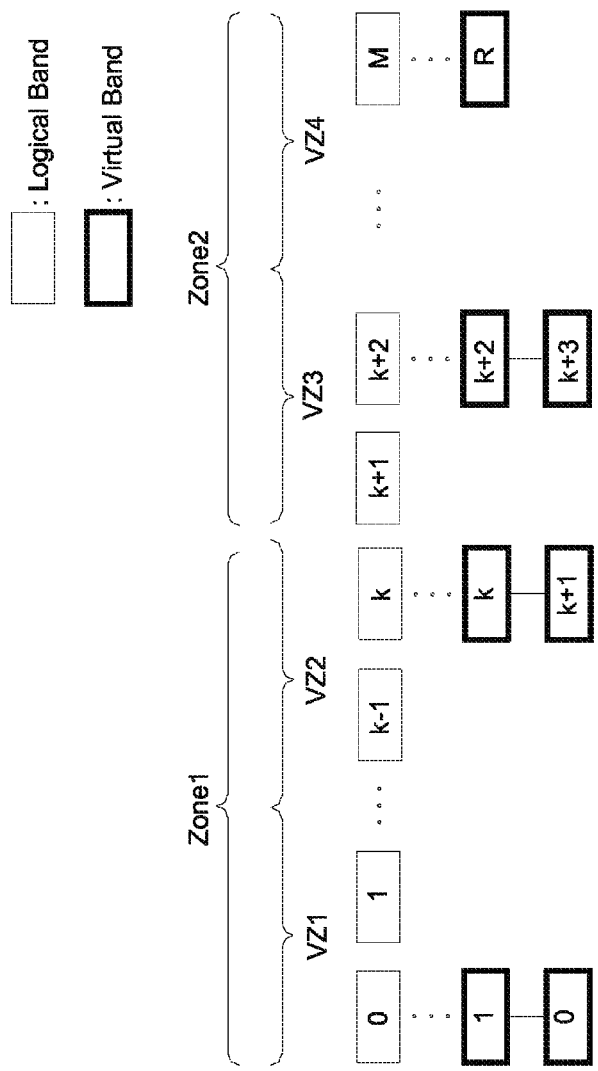
FIG. 16 is a view illustrating an example of the configuration of a virtual zone according to another embodiment of the inventive concept.

If a virtual zone is set, the mapping table 470-1 may include information representing the mapping structure of logical bands and virtual bands for each virtual zone. That is, the mapping table 470-1 may include information representing the mapping structure of virtual bands allocated and mapped to logical bands for each virtual zone as shown in FIG. 15 or FIG. 16.

The mapping table 470-1 may include information representing a virtual address corresponding to the LBA of a virtual band allocated to a logical band. Moreover, the mapping table 470-1 may include information about the last sector written for each virtual band allocated to a logical band.

Also, the mapping table 470-1 may include information for invalidating a virtual address corresponding to the LBA designated by a write command and already existing in a virtual band. That is, the mapping table 470-1 may include information for, upon updating of data for the same LBA, invalidating a virtual address already existing in the mapping table and corresponding to the LBA to be updated.

The virtual band size adjustment unit 430-1 is means for executing a process of adjusting the size of virtual bands, and adjusts the size of virtual bands in response to a command received from the host device as follows.

Figure 14:
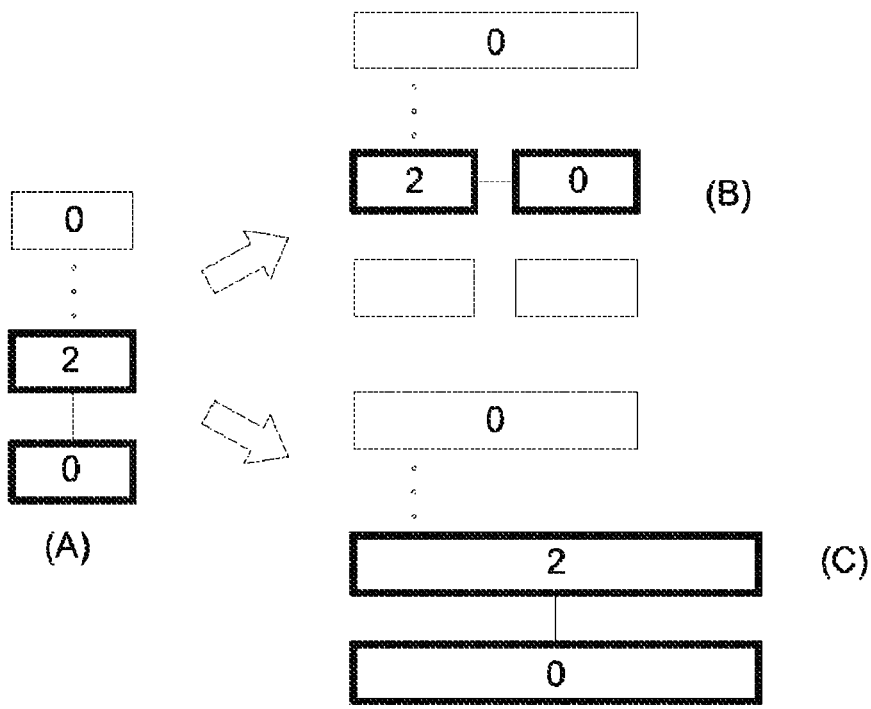
FIG. 14 is a view illustrating an example of virtual band size adjustment according to an embodiment of the inventive concept.

Referring to FIG. 14, the size of virtual bands may be set to be equal to the size of logical bands depending on the default value of the parameter for determining the virtual band size. That is, if the virtual band size is not adjusted, the logical band size and the virtual band size may be set equal as shown in FIG. 14(A). FIG. 14(A) shows a structure in which virtual bands 0 and 2 are allocated to a logical band.

If the processor 430 receives a command for reducing the size of the virtual bands, the virtual band size adjustment unit 430-1 changes the second parameter value for determining the virtual band size. Then, the virtual band size is decreased or increased in response to the change in the second parameter value for determining the virtual band size.

FIG. 14(B) shows an example of a decrease in the virtual band size, and FIG. 14(C) shows an example of an increase in the virtual band size.

FIG. 14(B) shows an example in which the virtual band size is decreased so as to operate two or more virtual bans to cover the entire logical band. That is, by setting the ratio of logical band to virtual bands to 1:N, even if invalid data is generated for a virtual band previously allocated and used for a frequently updated LBA, the absolute amount of data to be processed in a garbage collection process for selecting valid data alone from a virtual band, writing it on a new virtual band, and re-allocating the previous virtual band to a free queue becomes smaller. Due to this, the garbage collection process execution time can be shortened. For reference, the free queue stores information about virtual bands not allocated to the logical band.

FIG. 14(C) shows an example in which the virtual band size is greatly increased compared to the logical band size. As shown in FIG. 14(C), an increase in the virtual band size may lead to an increased marginal space in the virtual bands. Hence, the execution point of time of the garbage collection process for selecting valid data alone from a virtual band and writing it to a new virtual band is delayed. Due to this, the intervals of execution of the garbage collection process can be widened.

Accordingly, when storing data whose update frequency is not high, setting the virtual band size and the logical band size to be equal as shown in FIG. 14(A) may be effective in operating the virtual bands.

When it is required to frequently update a file with a relatively small capacity, setting the virtual band size to be smaller than the logical band size as shown in FIG. 14(B) may be effective in operating the virtual bands.

Next, when it is required to frequently update a file with a relatively large capacity, setting the virtual band size to be larger than the logical band size as shown in FIG. 14(C) may be effective in operating the virtual bands.

The virtual band size adjustment unit 430-1 may adjust the size of virtual bands for each individual physical zone of the storage medium. Moreover, the virtual band size adjustment unit 430-1 may adjust the size of virtual bands to be equal in every physical zone.

Also, the size of virtual bands can be adjusted in the manufacturing process of a storage device. In addition, the size of virtual bands can be adjusted according to the necessity of users in a user environment after the release of a product.

Next, the virtual zone setting unit 430-2 is means for integrating a plurality of physical zones of a storage medium into a single virtual zone or dividing a single physical zone into a plurality of virtual zones. A virtual zone is configured as follows in response to a command received from the host device.

Upon receiving a command for setting a virtual zone, the virtual zone setting unit 430-2 performs the process of integrating a plurality of physical zones of a storage medium into a single virtual zone or dividing a single physical zone into a plurality of virtual zones in response to a first parameter value for determining the virtual zone size.

FIG. 15 shows an example in which the virtual zone setting unit 430-2 integrates two physical zones into a single virtual zone. That is, as shown in FIG. 15, if physical zones 1 and 2 of the disk are integrated into virtual zone 1, physical zones 1 and 2 are mapped to virtual zone 1. Due to this, the virtual bands allocated to physical zones 1 and 2, respectively, can be allocated to virtual zone 1, regardless of the physical zones. That is, even when host commands for physical zone 1 are received in a concentrated manner and the virtual bands assigned to physical zone 1 are all allocated to the logical band and consumed, the virtual bands assigned to physical zone 2 can be used to execute the host commands for physical zone 1, thereby improving the access performance of the storage device.

FIG. 16 shows an example in which the virtual zone setting unit 430-2 divides a single physical zone into two virtual zones. That is, as shown in FIG. 16, if physical zone 1 is divided into virtual zones 1 and 2, the number and area of the virtual bands assigned to physical zone 1 are reduced. Thus, if successive access commands are generated for the same virtual zone using the virtual zones, the target tracking time for access can be reduced.

The address conversion processor 430-3 performs a process of converting an LBA designated by a received command into physical location information of the storage medium by using a virtual band and a virtual address. A detailed configuration of the address conversion processor 430-3 is illustrated in FIG. 12.

Figure 12:
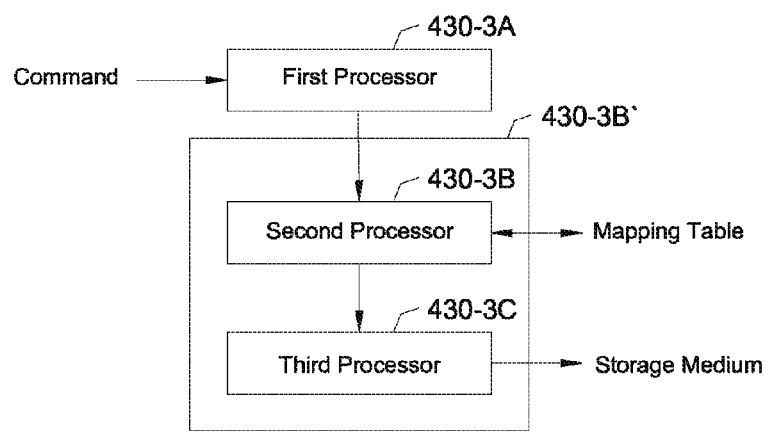
FIG. 12 is a detailed block diagram of an address conversion processor shown in FIG. 11.

As shown in FIG. 12, the address conversion processor 430-3 may include a first processor 430-3A, a second processor 430-3B, and a third processor 430-3C. The second processor 430-3B and the third processor 430-3C may be designed to be integrated into a single processor 430-3B'. Obviously, though not shown in the drawings, the first processor 430-3A and the second processor 430-3B also may be designed to be integrated into a single processor.

The first processor 430-3A performs the operation of extracting an LBA designated by a received command.

The second processor 430-3B performs the operation of converting the LBA extracted by the first processor 430-3A into a virtual address. That is, the second processor 430-3B performs the operation of searching the mapping table 470-1 and converting the LBA into a virtual address.

Figure 13:
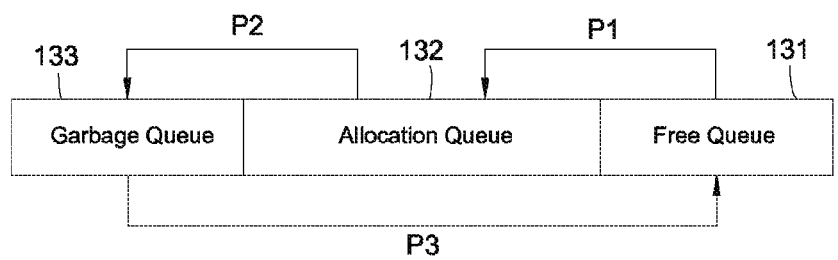
FIG. 13 is a detailed block diagram of a second processor shown in FIG. 12.

As shown in FIG. 13, the second processor 430-3B may include a free queue 131, an allocation queue 132, and a garbage queue 133. The second processor 430-3B converts an LBA designated by a command into a virtual address by using the free queue 131, the allocation queue 132, and the garbage queue 133.

The second processor 430-3B stores information about the virtual bands not assigned to a logical band in the free queue 131 in an order complying with a prescribed rule. The free queue 131 is means that stores information about virtual bands allocatable to a logical band in response to a command and is on standby for selection. The free queue 131 may store classified information about virtual bands allocatable to a logical band for each virtual zone or each physical zone.

The second processor 430-3B stores information about virtual bands allocated to a logical band in the allocation queue 132. Specifically, if the virtual bands allocated to a logical band including an LBA designated by the command do not exist in the mapping table 470-1 or all virtual addresses are already allocated and consumed for the virtual bands allocated to the logical band including the LBA designated by the command, the second processor 430-3B selects a virtual band on standby in the free queue 131, and allocates the virtual band to the logical band including the LBA designated by the command and moves it to the allocation queue 132.

Next, the second processor 430-3B allocates a virtual address corresponding to the LBA designated by the command based on the virtual band allocated to the logical band stored in the allocation queue 132. Concretely, if a new virtual address is allocated to the logical band including the LBA designated by the command and stored in the allocation queue 132, the second processor 430-3B allocates the newly allocated virtual address corresponding to the first sector of the logical band to the LBA designated by the command.

If a virtual band already allocated to the logical band including the LBA designated by the command exits in the allocation queue 132, the second processor 430-3B allocates a virtual address not allocated for the virtual band to the LBA designated by the command. For example, a virtual address of the sector right next to the last accessed sector in the virtual band can be allocated to the LBA designated by the command.

The second processor 430-3B selects a virtual band, whose number of virtual addresses invalidated because of data update exceeds a threshold value, from among the virtual bands allocated to the logical band, and moves it to the garbage queue 133 (P2).

For example, if the number of virtual bands stored in the free queue 131 is less than the initially set minimum value, the second processor 430-3B performs a garbage collection process. That is, the second processor 430-3B reads data stored in the sectors of valid virtual addresses from the virtual bands stored in the garbage queue 133, and executes rewriting to a newly allocated virtual address designated by a virtual band.

The second processor 430-3B moves information about the virtual band that has executed rewriting, among the virtual bands stored in the garbage queue 133, to the free queue 131 (P3).

Next, the third processor 430-3C controls the storage device to convert the virtual address converted in the second processor 430-3B into a physical address of the disk and access the storage medium in accordance with the converted physical address. That is, the third processor 430-3C generates a voice coil motor driving control signal for converting the virtual address into cylinder head sector (CHS) information representing the physical location of the disk and accessing the disk based on the converted CHS information.

Referring to FIGS. 4a and 4B, when the voice coil motor driving control signal generated by the third processor 430-3C is applied to the VCM driver 440, the VCM driver 440 generates a voice coil motor driving current corresponding to the voice coil motor driving control signal and supplies it to the voice coil motor 30. Therefore, the magnetic head 16 is moved to a track position of the disk desired to be accessed, and performs a data write or read operation corresponding to a command.

Next, a storage medium accessing method according to an embodiment of the inventive concept executed under the control of the processor 110 shown in FIGS. 1A and 1b or the processor 430 shown in FIGS. 4A and 4B will be described with reference to the flowchart of FIG. 17.

Figure 17:
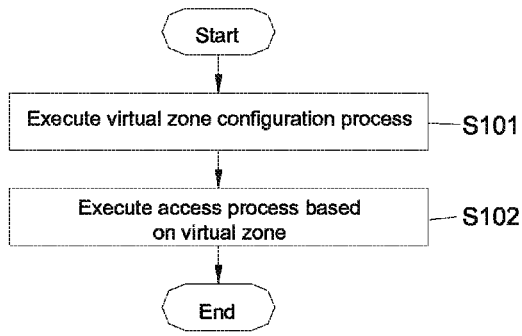
FIG. 17 is a flowchart of a storage medium accessing method according to an embodiment of the inventive concept.

The step 101 (S101) and step 102 (S102) shown in FIG. 17 can be executed in response to different commands, respectively, in a continuous or discontinuous manner. Also, the step 101 (S101) does not need to be executed each time an access process is executed. Still, the step 101 (S101) has to be executed in the storage device at least once.

Figure 18:
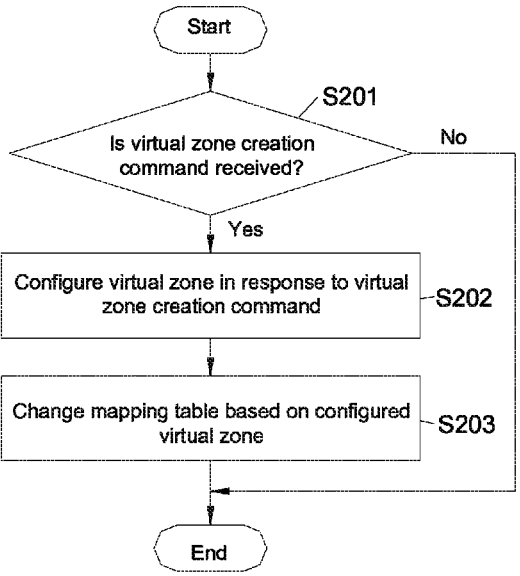
FIG. 18 is a detailed flowchart of a process for configuring a virtual zone shown in FIG. 17.

The processor 110 executes a process for configuring a virtual zone for the storage medium in response to a received command (S101). That is, the processor 110 configures a virtual zone such that a plurality of physical zones for the storage medium 150 are integrated into a virtual zone or a single physical zone is divided into a plurality of virtual zones. A detailed process for configuring a virtual zone is illustrated in FIG. 18.

Then, a detailed operation of the process for configuring a virtual zone will be described with reference to FIG. 18.

The processor 110 determines whether or not a virtual zone creation command is received from the host device 2000 via the host interface 160 (S201).

If a virtual zone creation command is received as a result of determination in the step 201 (S201), the processor 110 executes the process of configuring a virtual zone for the storage medium in response to the received virtual zone creation command (S202). That is, the processor 110 performs the process of configuring a virtual zone by integrating a plurality of physical zones for the storage medium into a single virtual zone in response to the received virtual zone creation command or dividing a single physical zone into a plurality of virtual zones. For example, as shown in FIG. 15, two physical zones 1 and 2 may be integrated into a virtual zone 1, and as shown in FIG. 16, a single physical zone may be divided into two virtual zones.

The processor 110 changes the mapping table based on the virtual zone configured in the step 202 (S202) (S203). That is, the processor 110 changes the mapping table from a mapping structure for allocating virtual bands to a logical band using virtual bands assigned for each physical zone to a mapping structure for allocating virtual bands to a logical band using virtual bands assigned for each virtual zone.

Figure 19:
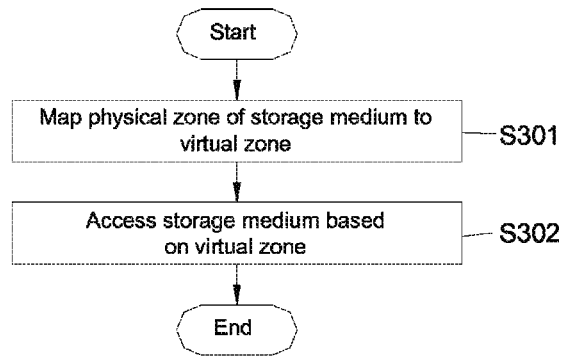
FIG. 19 is a detailed flowchart for handling the access process shown in FIG. 17.
Figure 20:
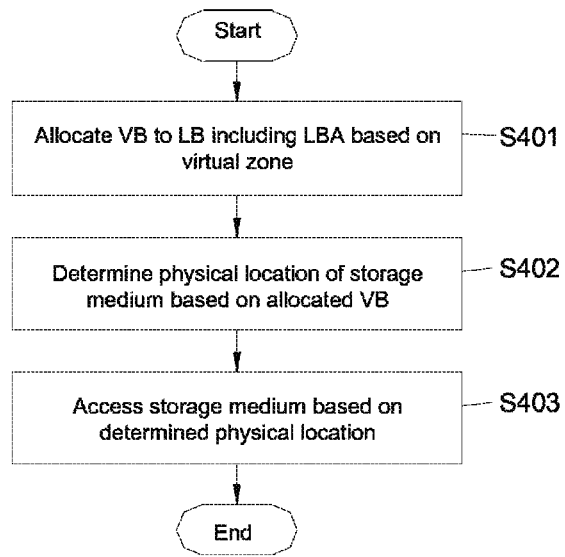
FIG. 20 is a detailed flowchart for handling the storage medium access shown in FIG. 19.

Referring again to FIG. 17, after completing the virtual zone configuration by executing the step 101 (S101) by the above-described operation, the processor 110 executes an access process based on a virtual zone (S102). Concretely, the processor 110 executes an access process by operating virtual bands included in a virtual zone based on a virtual zone integrated or divided from physical zones of the storage medium. A detailed process of executing access based on a virtual zone is illustrated in FIG. 19.

Now, a detailed operation of executing access based on a virtual zone according to an embodiment of the present invention will be described with reference to FIG. 19.

The processor 110 maps a physical zone of the storage medium 150 to a virtual zone (S301). That is, the processor 110 maps a physical zone of the storage medium 150 to a virtual zone based on a virtual zone configured in the step 101 (S101) of FIG. 17. For example, if a virtual zone is configured as shown in FIG. 15, physical zone 1 and physical zone 2 are mapped to virtual zone 1.

Next, the processor 110 executes the operation of accessing the storage medium 150 based on a virtual zone (S302). That is, the processor 110 controls the storage device to access the storage medium 150 using the virtual bands included in a physical zone mapped to a virtual zone. A detailed process of the operation for accessing the storage medium 150 will be described with reference to FIG. 20.

The processor 110 allocates virtual bands VB based on a virtual zone to a logical band LB including an LBA designated by a received command (S401).

For example, the processor 110 searches the mapping table 470-1, and if no virtual band is allocated to the logical band including the LBA designated by the command, may allocate a new virtual band included in a virtual zone to the logical band including the LBA designated by the command. Also, the processor searches the mapping table 470-1, and if all virtual addresses are already allocated to the virtual bands allocated to the logical band including the LBA designated by the command, may allocate a new virtual band included in a virtual zone to the logical band including the LBA designated by the command.

In another example, if there exists a virtual band which is not allocated to other logical bands, among the virtual bands included in the physical zone corresponding to the logical band including the LBA designated by the command, the processor 110 may allocate the virtual bands not allocated to other logical bands to the logical band including the LBA designated by the command. Also, if there exists no virtual band which is not allocated to other logical bands, among the virtual bands included in the physical zone corresponding to the logical band including the LBA designated by the command, the processor 110 may allocate a virtual band, which is not allocated to other logical bands included in a different physical zone of the virtual zone, to the logical band including the LBA designated by the command.

Next, the processor 110 executes the process of determining the physical location of the storage medium based on the virtual band allocated to the logical band including the LBA designated by the command (S402). For example, the processor 430 allocates a virtual address corresponding to the LBA designated by the command from a virtual band allocated in the step 401 (S401), and converts the allocated virtual address into physical access location information of the storage medium. If the storage medium is the disk 12, the physical access position information of the storage medium may be CHS information.

The virtual address allocated to the LBA designated by the command from the above-mentioned virtual band may be determined as a virtual address representing the first sector of a virtual band newly allocated to the logical band. The virtual address allocated to the LBA designated by the command in a virtual band already allocated to the logical band may be determined as a virtual address representing the next sector subsequent to the last sector written in the virtual band.

Next, the processor 110 control the storage device to access the storage medium based on the physical access location information converted in the step 402 (S402) (S403). That is, the processor 110 controls the storage medium interface 140 to access the storage medium to a position corresponding to the converted physical access information.

Next, a detailed operation of performing access based on a virtual zone in the disk drive according to another embodiment of the present invention will be described with reference to FIG. 21.

The processor selects a logical band corresponding to an LBA designated by a received command (S501). Specifically, the processor 430 selects a logical band corresponding to an LBA designated by a command received by the logical band including the LBA designated by the received command.

The processor 430 determines whether or not there exists a virtual band allocated to the logical band selected in the step 501 (S501) (S502). Specifically, the processor 430 determines whether or not there already exists a virtual band allocated to the logical band selected in the step 501 (S501) by searching the mapping table 470-1.

If there exists a virtual band allocated to the logical band selected in the step 501 (S501) as a result of determination of the step 502 (S502), the processor 430 determines whether or not there exists a virtual address VA allocatable in the allocated virtual band (S503). That is, it is determined whether or not all virtual addresses allocatable in the allocated virtual band are consumed.

If there exists no virtual band allocated to the logical band selected in the step 501 (S501) as a result of determination of the step 502 (S502), or there exists no virtual address allocatable in the allocated virtual band as a result of determination in the step 503 (S503), the processor 430 allocates a new virtual band to the logical band selected in the step 501 (S501) based on a virtual zone (S504). That is, the processor 430 may allocate a new virtual band included in a virtual zone to the logical band including the LBA designated by the command. If there exists a virtual band which is not allocated to other logical bands, among the virtual bands included in the physical zone corresponding to the logical band including the LBA designated by the command, the processor 430 may allocate the virtual bands not allocated to other logical bands to the logical band including the LBA designated by the command. Also, if there exists no virtual band which is not allocated to other logical bands, among the virtual bands included in the physical zone corresponding to the logical band including the LBA designated by the command, the processor 430 may allocate a virtual band, which is not allocated to other logical bands included in a different physical zone of the virtual zone, to the logical band including the LBA designated by the command.

Next, the processor 430 may allocate a virtual address VA corresponding to the LBA designated by the command based on an allocated virtual band (S505). Specifically, if a new virtual address is allocated in the step 504 (S504), the processor may allocate the newly allocated virtual address representing the first virtual sector to the LBA designated by the command. Also, if there exists a virtual address not allocated to the LBA in a virtual band already allocated to the logical band, the processor 430 may allocate a virtual address representing the next sector subsequent to the last sector written in the virtual band to the LBA designated by the command.

Figures 29, 30:
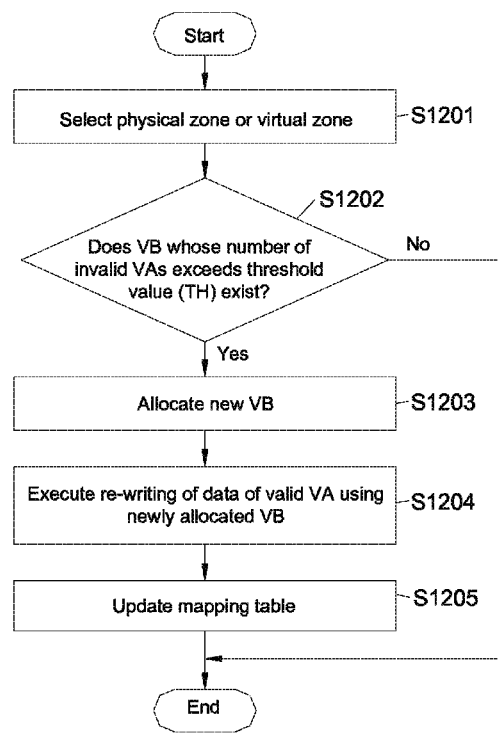
FIG. 29 is a flowchart of a garbage collection process according to an embodiment of the inventive concept.
FIG. 30 is a view showing a mapping structure for a virtual band using a shingle write method according to the inventive concept.

FIG. 30 shows a mapping structure for a virtual band when one virtual band to which an LBA-based shingle write method is applied consists of three tracks and one track consists of five sectors.

For example, if the mapping table 470-1 is searched to find out that a virtual band allocated to the logical band including the LBA designated by the command has the mapping structure as shown FIG. 30, the sector in which data is last written in the virtual band is SN8. Accordingly, in this case, the physical address of the next sector SN9 subsequent to the sector SN8 in which data is last written in the virtual band is allocated as a virtual address for the LBA designated by the command. If a new virtual band is allocated, the processor 430 allocates a virtual address corresponding to the first sector of the new virtual band to the LBA designated by the received command.

Moreover, if the virtual address corresponding to the LBA designated by the command is previously allocated in the corresponding virtual band, the processor 430 invalidates the previously allocated virtual address.

For example, as shown in FIG. 30, upon receiving a write command for designating LBAs 2 and 3 when data has been written according to the mapping structure for a virtual band, a virtual address is allocated such that data of LBAs 2 and 3 is sequentially written to the sectors SN9 and SN10 of the virtual band. Thereafter, because virtual addresses corresponding to LBAs 2 and 3 already exist in the corresponding virtual band, the virtual addresses for the sectors SN1 and SN6 corresponding to LBAs 2 and 3 already existing in the mapping table are invalidated.

Next, the processor 430 converts the virtual addresses allocated in the step 505 (S505) into CHS information corresponding to the physical access location information of the disk 12 (S506).

Next, the processor 430 accesses the disk 12 based on the CHS information corresponding to the physical access location information converted in the step 506 (S506) (S507). Specifically, the processor 430 generates a voice coil motor driving control signal for moving the magnetic head 16 to a target track position of the disk based on the converted CHS information. Referring to FIGS. 4A and 4B, when the thus-generated voice coil motor driving control signal is applied to the VCM driver 440, the VCM driver 440 generates a voice coil motor driving current corresponding to the voice coil motor driving control signal and supplies it to the voice coil motor 30. Therefore, the magnetic head 16 is moved to a track position of the disk desired to be accessed, and performs a data write or read operation corresponding to a command.

By the above-described operation, the LBA designated by a command can be converted into a virtual address to sequentially write data in one direction on the storage medium based on a virtual zone, and the storage medium can be accessed based on the converted virtual address.

Figure 22:
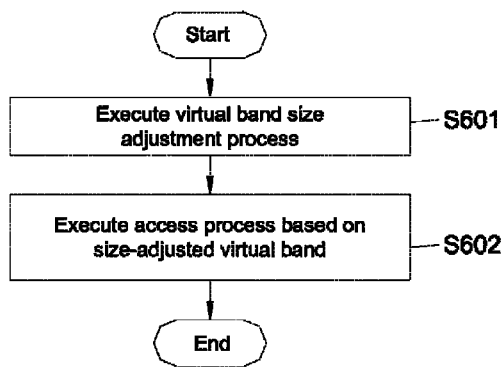
FIG. 22 is a flowchart of a storage medium accessing method according to another embodiment of the inventive concept.
Figure 23:
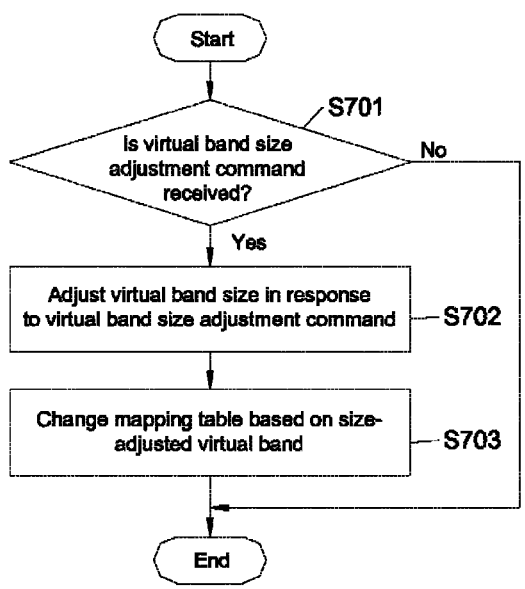
FIG. 23 is a detailed flowchart of a virtual band size adjustment process shown in FIG. 22.

Next, a storage medium accessing method according to another embodiment of the inventive concept executed under the control of the processor 110 shown in FIGS. 1A and 1*b* or the processor 430 shown in FIGS. 4A and 4B will be described with reference to the flowchart of FIG. 22.

Figure 21:
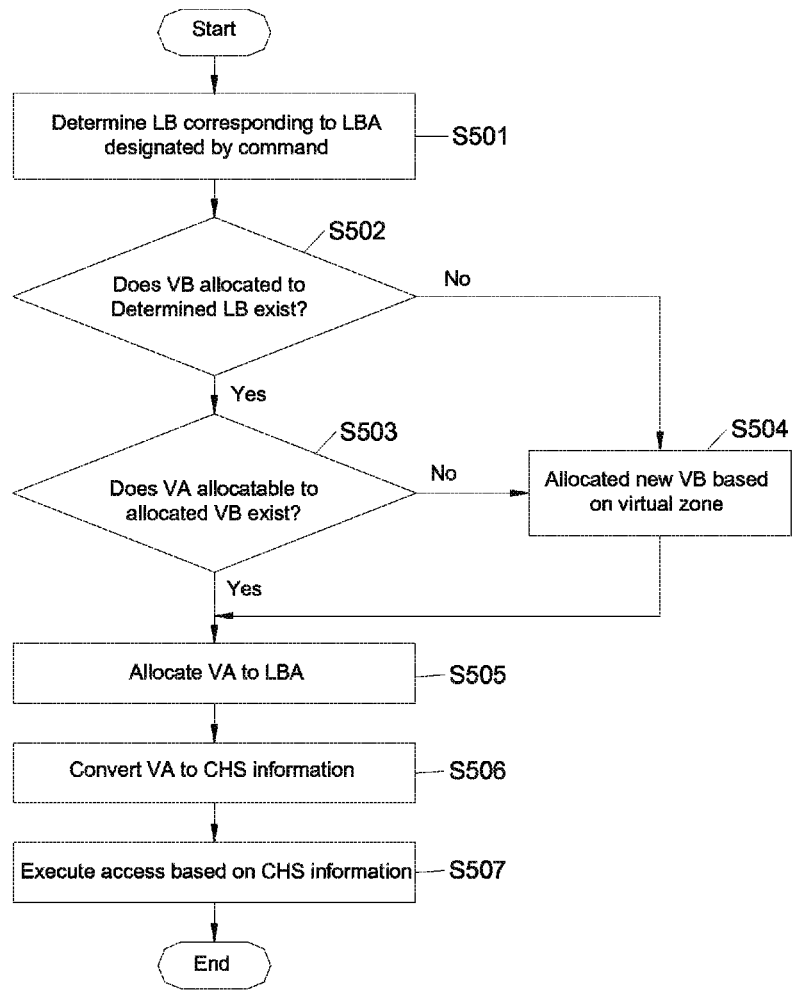
FIG. 21 is a detailed flowchart for handling the access process shown in FIG. 17 in the disk drive of FIG. 4.

The step 601 (S601) and step 602 (S602) shown in FIG. 21 can be executed in response to different commands, respectively, in a continuous or discontinuous manner. Also, the step 601 (S601) does not need to be executed each time an access process is executed.

The processor 110 executes the process for adjusting the size of virtual bands for the storage medium 150 (S601). That is, the processor 110 executes the process for adjusting the size of a physical space of the storage medium corresponding to each virtual band. A detailed process for adjusting the virtual band size will be described with reference to FIG. 23.

The processor 110 determines whether or not a virtual band size adjustment command is received from the host device 2000 via the host interface 160 (S701).

If a virtual band adjustment command is received as a result of determination in the step 701 (S701), the processor executes the process of adjusting the virtual band size for the disk in response to the received virtual band size adjustment command (S702). That is, the processor 110 decreases or increases the currently set virtual band size in response to the received virtual band size adjustment command. For example, as shown in FIG. 14(A), the virtual band size can be adjusted so that the logical band size and the virtual band size are equal. Also, as shown in FIG. 14(B), the virtual band size can be adjusted such that the virtual bands size is smaller than the logical band size. Moreover, as shown in FIG. 14(C), the virtual band size can be adjusted such that the virtual band size is greater than the logical band size.

The processor 110 changes the mapping table based on a virtual band size-adjusted in the step 701 (S701) (S703). That is, the processor 110 changes the mapping table 470-1 such that new virtual bands are configured based on a size-adjusted virtual band, and virtual addresses corresponding to an LBA are allocated based on the new configured virtual bands.

Figure 24:
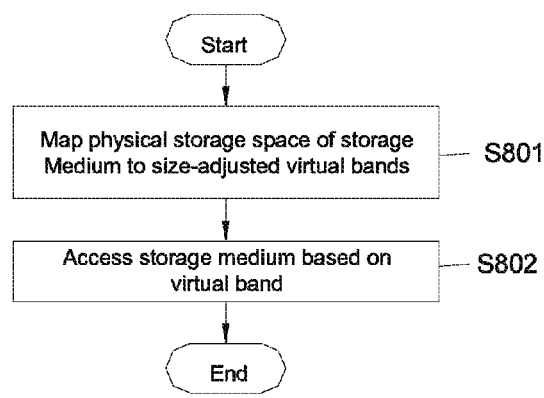
FIG. 24 is a detailed flowchart for handling the access process shown in FIG. 22.

Referring again to FIG. 22, after adjusting the virtual band size by executing the step 601 (S601) by the above-described operation, the processor 110 executes an access process based on a size-adjusted virtual band (S602). That is, the processor 110 allocates a size-adjusted virtual band to a logical band corresponding to an LBA designated by a command, and controls the storage medium interface 140 to execute access based on the allocated virtual band. A detailed process for executing access based on a size-adjusted virtual band is illustrated in FIG. 24.

Next, a detailed operation of performing access based on a size-adjusted virtual band according to an embodiment of the present invention will be described with reference to FIG. 24.

The processor 110 maps a physical storage space of the storage medium 150 to size-adjusted virtual bands (S801). That is, for example, the processor 110 virtually segments a physical storage space of the storage medium 150 and maps it to size-adjusted virtual bands shown in FIG. 14.

Next, the processor 110 controls the storage device to access the storage medium 150 based on a size-adjusted virtual band (S802). A process for a detailed operation for accessing the storage medium will be described in FIG. 25.

Figure 25:
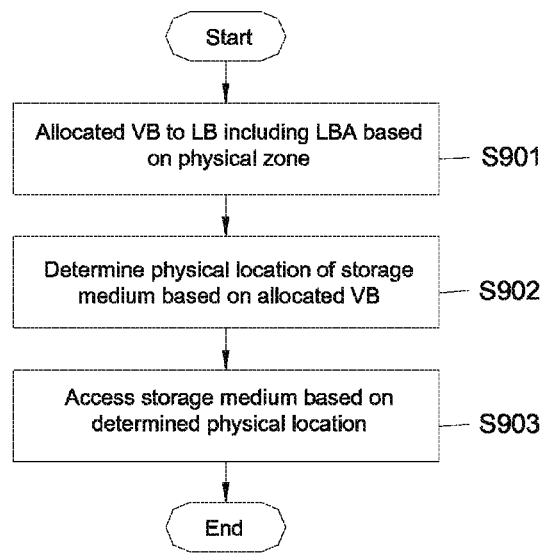
FIG. 25 is a detailed flowchart for handling the storage medium access shown in FIG. 24.

An operation for accessing the storage medium will be described with reference to FIG. 25.

The processor 110 allocates virtual bands based on a physical zone of the storage medium to a logical band including an LBA designated by a received command (S901).

Specifically, the processor 110 searches the mapping table 470-1, and if no virtual band is allocated to the logical band including the LBA designated by the command, may allocate a new virtual band included in a physical zone to the logical band including the LBA designated by the command. Also, the processor searches the mapping table 470-1, and if all virtual addresses are already allocated to the virtual bands allocated to the logical band including the LBA designated by the command, may allocate a new virtual band included in a physical zone to the logical band including the LBA designated by the command.

Next, the processor 110 executes the process of determining the physical location of the storage medium based on the virtual band allocated to the logical band including the LBA designated by the command (S902). For example, the processor 430 allocates a virtual address corresponding to the LBA designated by the command from a virtual band allocated in the step 901 (S901), and converts the allocated virtual address into physical location information of the storage medium. For example, if the storage medium is the disk, the physical position information of the storage medium may be CHS information.

The virtual address allocated to the LBA designated by the command may be determined as a virtual address representing the first sector of a virtual band newly allocated to the logical band. The virtual address allocated to the LBA designated by the command in a virtual band already allocated to the logical band may be determined as a virtual address representing the next sector subsequent to the last sector written in the virtual band.

Next, the processor 110 control the storage device to access the storage medium based on the physical location information converted in the step 902 (S902) (S903). That is, the processor 110 controls the storage medium interface 140 to access the storage medium to a position corresponding to the converted physical access information.

Next, a detailed operation of performing access based on a size-adjusted virtual band in the disk drive according to another embodiment of the present invention will be described with reference to FIG. 26.

Figure 26:
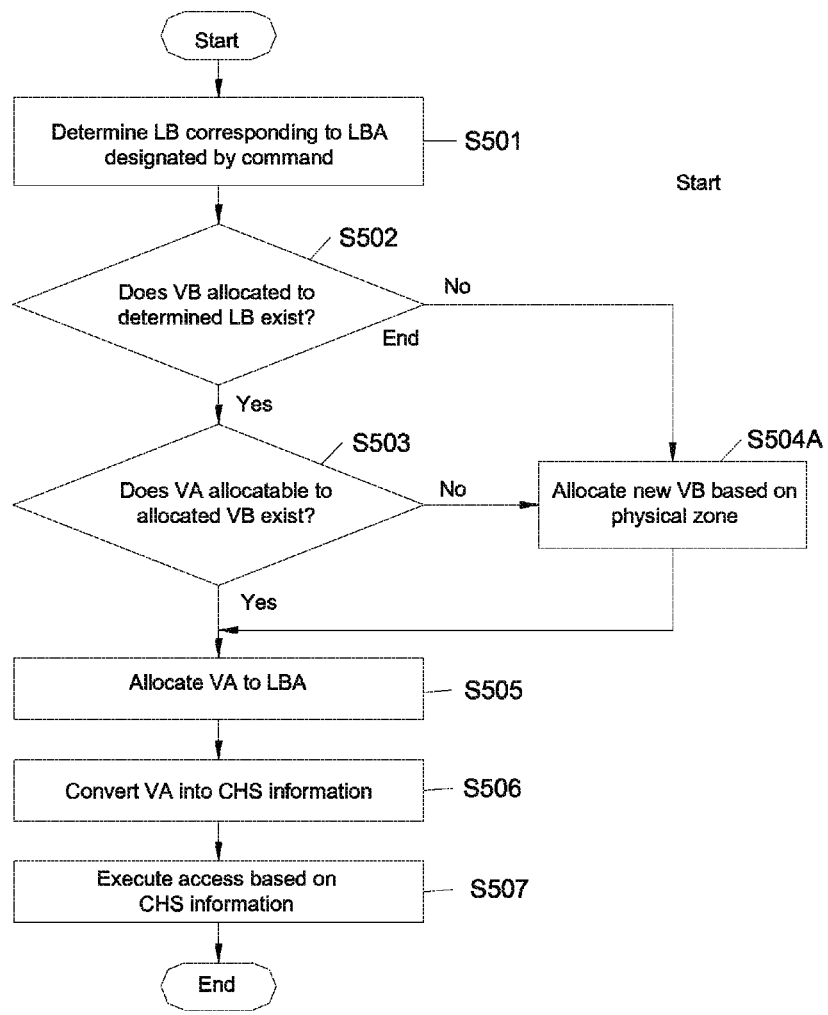
FIG. 26 is a detailed flowchart for handling the access process shown in FIG. 22 in the disk drive of FIG. 4.

The steps 501 (S501) through 503 (S503) and the steps 505 (S505) through 507 (S507) of the flowchart of FIG. 26 performs the same operation as the steps 501 (S501) through 503 (s503) and the steps 505 (S505) through 507 (S507) shown in FIG. 21, so repetitive descriptions will be omitted.

Accordingly, only the step S504A (S504A), which is different from that of the flowchart of FIG. 21, will be described.

If there exists no virtual band allocated to the logical band selected in the step 501 (S501) as a result of determination of the step 502 (S502), or there exists no virtual address, which is not allocated to an LBA, in a virtual band allocated to the logical band a result of determination in the step 502 (S502), the processor 110 allocates a new virtual band included in a physical zone to the logical band selected in the step 501 (S501). The newly allocated virtual band may be selected from among the virtual bands stored in the free queue 131 shown in FIG. 13.

Figure 27:
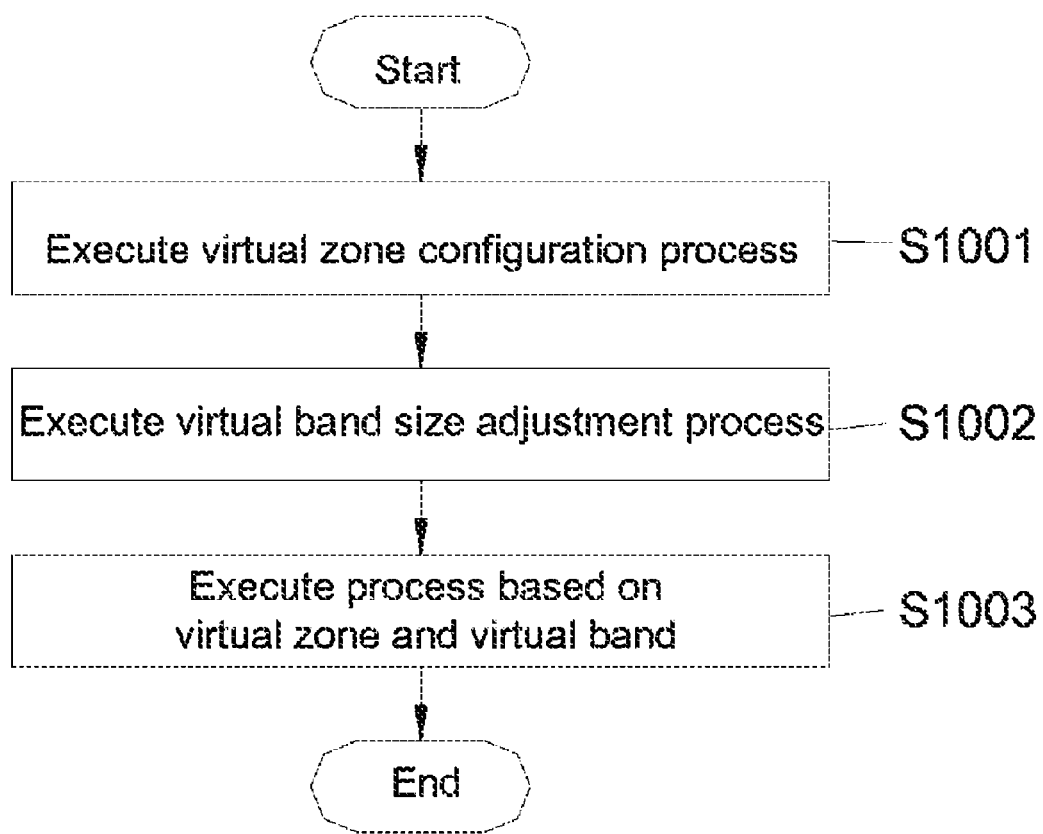
FIG. 27 is a flowchart of a storage medium accessing method according to yet another embodiment of the inventive concept.

Next, a storage medium accessing method according to yet another embodiment of the inventive concept executed under the control of the processor 110 shown in FIGS. 1A and 1*b* or the processor 430 shown in FIGS. 4A and 4B will be described with reference to the flowchart of FIG. 27.

The processor 110 executes a process for configuring a virtual zone for the storage medium 150 (S1001). A detailed process for configuring a virtual zone has been described in detail in FIG. 18, so repetitive description will be omitted.

Next, the processor 110 executes a process for adjusting the size of virtual bands for the storage medium 150 (S1002). A detailed process for adjusting the size of virtual bands has been described in detail in FIG. 23, so repetitive description will be omitted.

After completing the virtual zone configuration and the virtual band size adjustment, the processor 110 executes an access process based on a virtual zone and a virtual band (S1003). The access process based on a virtual zone and a virtual band has been described in detail with references to FIGS. 19 to 21 and FIGS. 24 to 26, so repetitive description will be omitted.

For reference, the access process is executed after executing the virtual zone configuration process in an embodiment of the present invention according to the flowchart shown in FIG. 17. Also, the access process is executed after executing the virtual band size adjustment process in another embodiment of the present invention according to the flowchart shown in FIG. 22. On the contrary, the access process is executed after executing the virtual zone process and the virtual band size adjustment process, respectively, in yet another embodiment of the present invention according to the flowchart shown in FIG. 27.

Figure 28:
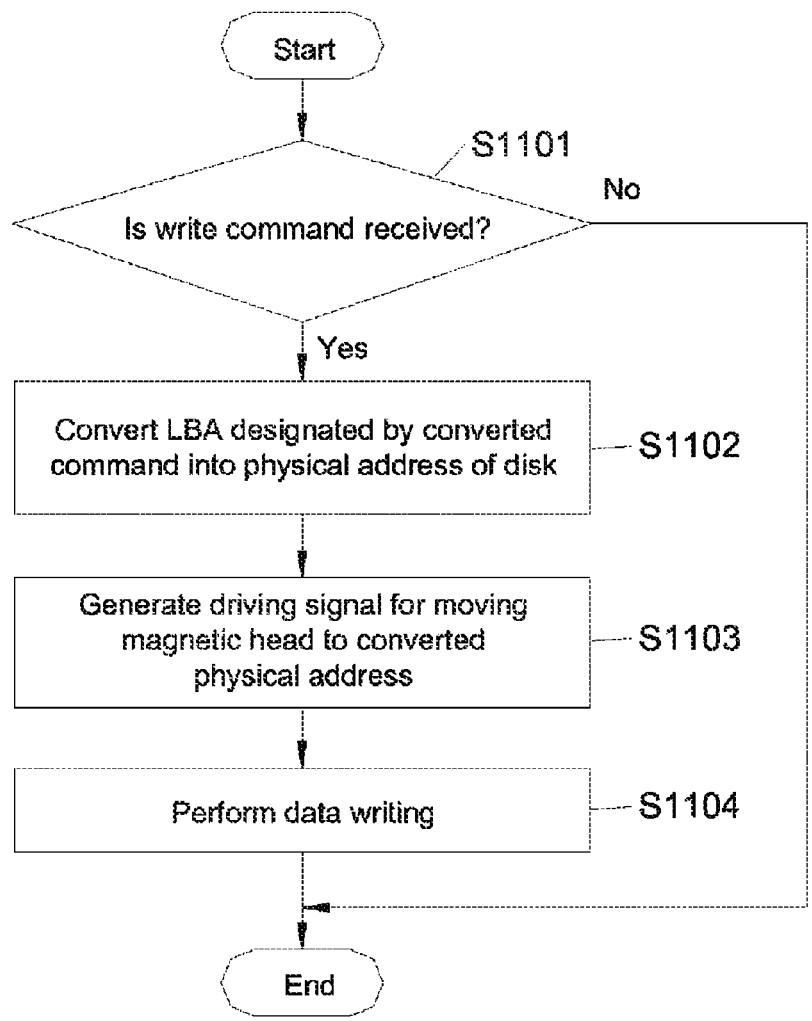
FIG. 28 is a flowchart of a data writing method according to an embodiment of the inventive concept.

Next, a method for performing a data write process based on a virtual zone or size-adjusted virtual band in a disk drive according to yet another embodiment of the present invention will be described with reference to FIG. 28.

The processor 430 determines whether or not a write command is received via the host interface 480 (S1101).

If a write command is received as a result of determination in the step S1101, the processor 430 converts an LBA designated by the write command into a physical address of the disk 12 (S1102).

If a virtual zone is set, the LBA designated by the write command can be converted into a physical address of the disk 12 by executing the process in the steps 501 (S501) through 506 (S506) shown in FIG. 21. If no virtual zone is set, the LBA designated by the write command can be converted into a physical address of the disk 12 by executing the process in the steps 501 (S501) through 506 (S506) shown in FIG. 26.

Next, the processor 430 generates a driving signal for moving the magnetic head 16 to the converted physical address location of the disk 12 (S1103). Specifically, the processor 430 generates a voice coil motor driving control signal for moving the magnetic head 16 to the position of the disk 12 based on the converted CHS information. In this way, the magnetic head 16 can be moved to a target track position of the disk in response to the generated voice coil motor driving control signal.

Also, the processor 430 controls the disk drive to write data to the position corresponding to the CHS information of the disk 12 (S1104).

Next, a garbage collection process for discarding invalid data in a virtual band according to an embodiment of the present invention will be described with reference to FIG. 29.

The garbage collection process can be executed under the control of the processor 110 shown in FIGS. 1A and 1B or the processor 430 shown in FIGS. 4A and 4B. For convenience of explanation, the description will be made for a case in which the garbage collection process is executed by the processor 110.

For example, the storage device may be designed such that the garbage collection process is executed in an idle mode. The idle mode refers to a mode for saving the power consumption of the storage device if a new command is not received for a predetermined period of time after the storage executes a command.

The processor 110 selects a physical zone or virtual zone for executing the garbage collection process (S1201). For example, the processor 110 may select a zone based on the number of invalid sectors by using the mapping table. That is, a physical zone or virtual zone can be selected in the order of the number of invalid virtual addresses. The number of invalid virtual addresses refers to the number of sectors on which invalid data is written.

When a physical zone or virtual zone is selected, the processor 110 determines whether or not there exists a virtual band whose number of invalid addresses exceeds a threshold value TH, from among the virtual bands included in the selected physical zone or virtual zone (S1202).

If there exists a virtual band whose number of invalid addresses exceeds a threshold value TH as a result of determination in the step 1202 (S1202), the processor 110 allocates a new virtual band to a logical band mapped corresponding to the virtual band whose number of invalid addresses exceeds the threshold value TH (S1203).

For example, the number of invalid virtual addresses in a virtual band VB_M shown in FIG. 32 is 6. If the threshold value TH is set to 5, the virtual band VB_M shown in FIG. 32 corresponds to a virtual band whose number of invalid addresses exceeds the threshold value TH. Accordingly, in this case, a new virtual band VB_N is allocated.

Next, the processor 110 rewrites data written to a valid virtual address in the previously allocated virtual band VB_M on the sector corresponding to a virtual address allocated in a new virtual band (S1204).

That is, as shown in FIG. 32, data written based on a virtual address allocated in the previously allocated virtual band VB_M on the sector corresponding to a virtual address allocated in a new virtual band VB_N. FIG. 32 shows an example in which rewriting is executed in the order of LBAs in a newly allocated virtual band VB_N.

Next, the processor 110 updates the mapping table (S1205). That is, mapping information in about the previous virtual band VB_M on which the garbage collection process has been executed is deleted from the mapping table, and mapping information about the newly allocated virtual band VB_N is added to the mapping table 470-1.

Next, a method for executing virtual zone configuration and virtual band size adjustment for a storage medium over a network according to an embodiment of the inventive concept will be described.

First, a network system for performing the method for adjusting the parameter values relating to the virtual zone configuration and virtual band size adjustment for a storage medium over a network will be described with reference to FIG. 33.

As shown in FIG. 33, the network system according to an embodiment of the inventive concept includes a program provision terminal 310, a network 320, a host PC 330, and a storage device 340.

The network 320 may be implemented as a communication network such as the internet. Obviously, the network 320 may be implemented as a wireless communication network, as well as a wired communication network.

The program provision terminal 310 stores a parameter adjustment program for configuring a virtual zone and adjusting a virtual band size, which is used to execute the storage medium access according to the inventive concept shown in FIGS. 17 to 29.

The program provision terminal 310 executes a process for transmitting the parameter adjustment program to the host PC 330 in response to a program transmission request from the host PC 330 connected via the network 320.

The host PC 330 is provided with hardware and software which is capable of connecting to the parameter adjustment program provision terminal 310 via the network 320, requesting the transmission of the parameter adjustment program, and executing the operation of downloading the requested parameter adjustment program from the program provision terminal 310.

Also, the host PC 330 allows the parameter adjustment method for configuring a virtual zone and adjusting a virtual band size according to the inventive concept based on the method shown in FIGS. 17 to 29 to be executed for the storage medium 340 by the parameter adjustment program downloaded from the program provision terminal 310.

Then, the method for performing the parameter adjustment for the storage device to configure a virtual zone and adjust a virtual band size for the storage medium via the network according to an embodiment of the inventive concept will be described with reference to the flowchart of FIG. 34.

First of all, the host PC 330 using the storage device 340 such as a disk drive connects to the program provision terminal 310 via the network 320 (S1301).

After connecting to the program provision terminal 310, the host PC 330 transmits information requesting the transmission of the parameter adjustment program relating to virtual zone configuration and virtual band size adjustment to the program provision terminal 310 (S1302).

Then, the program provision terminal 310 transmits the requested parameter adjustment program to the host PC 330, so that the host PC 330 downloads the parameter adjustment program relating to virtual zone configuration and virtual band size adjustment (S1303).

Next, the host PC 330 allows the downloaded parameter adjustment program to be executed on the storage device (S1304). By executing the parameter adjustment program on the storage device, the first parameter value for determining the size of the virtual zones or the second parameter value for determining the size of a plurality of virtual bands allocated for each physical zone of the storage medium is adjusted so that a plurality of physical zones of the storage medium are integrated into a single virtual zone or a single physical zone is divided into a plurality of virtual zones.

Accordingly, as shown in FIGS. 15 and 16, the adjusted first parameter value can be used to integrate a plurality of physical zones into a single virtual zone or divide a single physical zone into a plurality of virtual zones. Moreover, as shown in FIGS. 11(A), (B), and (C), the adjusted second parameter value can be used to set the virtual band size and the logical band size to be equal or decrease or increase the virtual band size.

The mapping table is changed based on a virtual band on which virtual zone configuration and size adjustment are executed (S1305). That is, the mapping table is changed such that virtual bands assigned for each virtual zone are used to allocate the virtual bands, new virtual bands are configured based on a size-adjusted virtual band, and a virtual address corresponding to an LBA is allocated based on the newly configured virtual bands.

By the above-described operation, virtual zone configuration and virtual band size adjustment can be performed on a storage medium of a storage device that performs access using a virtual address via a wired or wireless network.

In some embodiments, a storage medium accessing method may comprise: mapping a physical zone of a storage medium to a virtual zone; and accessing the storage medium based on the virtual zone, wherein the virtual zone is mapped so as to correspond to a plurality of physical zones or correspond to some of a single physical zone. The embodiment may include, wherein a plurality of virtual bands are allocated for each physical zone of the storage medium. The embodiment may include, wherein the number of virtual bands allocated for each physical zone of the storage medium is set to be greater than the number of logical bands classified based on logical block addresses allocated for each physical zone of the storage medium. The embodiment may include, wherein the logical band is defined as a set of logical block addresses in units of a first size. The embodiment may include, wherein the logical band is defined as a set of consecutive block addresses in units of a first size. The embodiment may include, wherein the virtual band is a segment of a second size of a physical storage space of the storage medium. The embodiment may include, wherein the storage medium comprises a disk, and the virtual band is defined as a set of tracks of the disk in units of a second size. The embodiment may include, wherein the storage medium comprises a disk, and the virtual band is defined as a set of consecutive tracks of the disk in units of a second size. The embodiment may include, wherein the step of accessing the storage medium comprises the steps of: allocating a virtual band included in a virtual zone corresponding to a logical band to the logical band including a logical block address designated by a command; determining the physical location of the storage medium to be accessed based on the allocated virtual band; and accessing the determined physical location of the storage medium, wherein the logical band is defined as a set of logical block addresses in units of a first size, and the virtual band is defined as a segment of a second size of a physical storage space of the storage medium. The embodiment may include, wherein the command comprises a write command. The embodiment may include, wherein, in the step of allocating a virtual band, if there exists no virtual band allocated to the logical band including the logical block address designated by the command, a new virtual band not allocated to other logical bands, among the virtual bands included in the virtual zone, is allocated. The embodiment may include, wherein, in the step of allocating a virtual band, if there is no virtual address not allocated to a logical block address in the virtual band allocated to the logical band including the logical block address designated by the command, a new virtual band not allocated to other bands, among the virtual bands included in the virtual zone, is allocated. The embodiment may include, wherein the step of allocating a virtual band comprises the steps of: if there exists a virtual band not allocated to other logical bands, among the virtual bands included in the physical zone corresponding to the logical band including the logical block address designated by the command, allocating the virtual band not allocated to other logical bands to the logical band including the logical block address designated by the command; and if there exists no virtual band not allocated to other logical bands, among the virtual bands included in the physical zone corresponding to the logical band including the logical block address designated by the command, allocating a virtual band not allocated to other logical bands included in other physical zones of the virtual zone to the logical band including the logical block address designated by the command. The embodiment may include, wherein the step of determining the physical location of the storage medium to be accessed comprises the steps of: allocating a virtual address corresponding to the logical block address designated by the command from the allocated virtual band; and converting the allocated virtual address into physical location information of the storage medium. The embodiment may include, wherein, if the virtual address corresponding to the logical block address designated by the command is previously allocated in the virtual band, the previously allocated virtual address is invalidated. The embodiment may include, wherein a logical block address designated by a command is converted into a virtual address to sequentially write data in one direction on the storage medium based on a virtual zone, thereby accessing the storage medium. The embodiment may include, wherein a plurality of virtual bands are allocated for each physical zone of the storage medium, and the storage medium is accessed to sequentially write data in an inner our outer circumferential direction in the physical zone of the storage medium corresponding to the virtual bands. The embodiment may include, wherein the step of accessing the storage medium comprises the steps of: searching a virtual address to be accessed using a mapping table based on a virtual band allocated to a logical band for each virtual zone; and accessing the location of the storage medium corresponding to the searched virtual address. The embodiment may include, further comprising the step of adjusting the size of virtual bands segmented from a physical storage space of the storage medium included in the virtual zone.

In some embodiments a storage medium accessing method may comprise: integrating a plurality of physical zones of a storage medium into a single virtual zone or dividing a single physical zone into a plurality of virtual zones; and accessing the storage medium based on the virtual zone. The embodiment may include, wherein the step of accessing the storage medium comprises the steps of: allocating a virtual band included in a virtual zone corresponding to a logical band to the logical band including a logical block address designated by a command; determining the physical location of the storage medium to be accessed based on the allocated virtual band; and accessing the determined physical location of the storage medium, wherein the logical band is defined as a set of logical block addresses in units of a first size, and the virtual band is defined as a segment of a second size of a physical storage space of the storage medium. The embodiment may include, wherein, in the step of allocating a virtual band, if there exists no virtual band allocated to the logical band including the logical block address designated by the command, a new virtual band not allocated to other logical bands, among the virtual bands included in the virtual zone, is allocated. The embodiment may include, wherein, in the step of allocating a virtual band, if there is no virtual address not allocated to a logical block address in the virtual band allocated to the logical band including the logical block address designated by the command, a new virtual band not allocated to other bands, among the virtual bands included in the virtual zone, is allocated.

In some embodiments a storage medium accessing method may comprise: mapping a physical storage space of a storage medium to virtual bands; and accessing the storage medium based on the virtual bands, wherein the size of the physical storage space of the storage medium corresponding to each virtual band is adjusted in response to an initially set command. The embodiment may include, wherein, in the step of accessing the storage medium, the storage medium is accessed based on a virtual band allocated to a logical band included in a logical block address designated by a command. The embodiment may include, wherein one or more virtual bands are allocated to the logical band including the logical block address designated by the command. The embodiment may include, wherein the virtual band size is adjusted to be greater or smaller than the logical band size. The embodiment may include, wherein the virtual band size is adjusted to be equal to the logical band size. The embodiment may include, wherein the virtual band size is adjusted for each physical zone of the storage medium in response to the initially set command. The embodiment may include, wherein the step of accessing the storage medium comprises the steps of: allocating a virtual band to a logical band including a logical block address designated by a command; allocating a virtual address corresponding to the logical block address designated by the command based on the allocated virtual band; and accessing the location of the storage medium corresponding to the allocated virtual address. The embodiment may include, wherein the command comprises a write command. The embodiment may include, wherein, in the step of allocating a virtual band, if there exists no virtual band allocated to the logical band including the logical block address designated by the command, a new virtual band not allocated to other logical bands is allocated. The embodiment may include, wherein, in the step of allocating a virtual band, if there is no virtual address not allocated to a logical block address in the virtual band allocated to the logical band including the logical block address designated by the command, a new virtual band not allocated to other bands is allocated. The embodiment may include, wherein the command comprises a write command, and if a virtual address corresponding to a logical block address designated by the write command is previously allocated in the virtual band, the previously allocated virtual address is invalidated. The embodiment may include, further comprising the step of selecting only data written on a valid virtual address of the virtual band and executing rewriting based on the newly allocated virtual band. The embodiment may include, wherein a plurality of virtual bands are allocated for each physical zone of the storage medium, and the storage medium is accessed to sequentially write data in an inner our outer circumferential direction in the physical zone of the storage medium corresponding to the virtual bands. The embodiment may include, wherein the step of accessing the storage medium comprises the steps of: searching a virtual address to be accessed using a mapping table based on a virtual band allocated to a logical band; and accessing the location of the storage medium corresponding to the searched virtual address. The embodiment may include, wherein the mapping table comprises at least information regarding a logical band corresponding to logical block addresses, virtual bands, and the last virtual address accessed by each virtual band.

In some embodiments a storage medium accessing method may comprise: adjusting the size of virtual bands segmented from a physical storage space of a storage medium; and accessing the storage medium based on the size-adjusted virtual bands. The embodiment may include, wherein the step of accessing the storage medium comprises the steps of: allocating a virtual band to a logical band including a logical block address designated by a command; allocating a virtual address corresponding to the logical block address designated by the command based on the allocated virtual band; and accessing the location of the storage medium corresponding to the allocated virtual address. The embodiment may include, wherein, in the step of allocating a virtual band, if there exists no virtual band allocated to the logical band including the logical block address designated by the command, a new virtual band not allocated to other logical bands is allocated. The embodiment may include, wherein, in the step of allocating a virtual band, if there is no virtual address not allocated to a logical block address in the virtual band allocated to the logical band including the logical block address designated by the command, a new virtual band not allocated to other bands is allocated.

In some embodiments a data writing method may comprise: converting a logical block address designated by a write command into a physical address of a disk by using a virtual zone and virtual bands corresponding to a physical zone of the disk; generating a driving signal for moving a magnetic head to the converted physical address location of the disk; and executing data writing on the physical address location of the disk to which the magnetic head is moved in response to the driving signal, wherein, in response to an initially set first command, a plurality of physical zones of the disk are integrated into a single virtual zone or a single physical zone is divided into a plurality of virtual zones. The embodiment may include, wherein a plurality of virtual bands are allocated to the virtual zone, and a virtual band included in the virtual zone corresponding to a logical band including a logical block address designated by a received write command is allocated to the logical band. The embodiment may include, wherein the virtual band size is adjusted in response to an initially set second command. The embodiment may include, wherein a logical block address designated by a write command is converted into a physical address of the disk to sequentially write data in either one of the inner and outer circumferential directions of the disk based on the virtual zone and the virtual bands. The embodiment may include, wherein the step of converting into a physical address of the disk comprises the steps of: allocating a virtual band included in the virtual zone corresponding to a logical band including the logical block address designated by the write command is allocated to the logical band; and converting the logical block address designated by the write command into a virtual address based on the allocated virtual band; and converting the converted virtual address into the physical address. The embodiment may include, wherein, in the step of allocating a virtual band, if there exists no virtual band allocated to the logical band including the logical block address designated by the write command, a new virtual band not allocated to other logical bands, among the virtual bands included in the virtual zone, is allocated. The embodiment may include, wherein, in the step of allocating a virtual band, if there is no virtual address not allocated to a logical block address in the virtual band allocated to the logical band including the logical block address designated by the write command, a new virtual band not allocated to other bands, among the virtual bands included in the virtual zone, is allocated. The embodiment may include, wherein the step of allocating a virtual band comprises the steps of: if there exists a virtual band not allocated to other logical bands, among the virtual bands included in the physical zone corresponding to the logical band including the logical block address designated by the write command, allocating the virtual band not allocated to other logical bands to the logical band including the logical block address designated by the write command; and if there exists no virtual band not allocated to other logical bands, among the virtual bands included in the physical zone corresponding to the logical band including the logical block address designated by the write command, allocating a virtual band not allocated to other logical bands included in other physical zones of the virtual zone to the logical band including the logical block address designated by the command. The embodiment may include, wherein the logical block address designated by the write command is converted into a virtual address not allocated in the allocated virtual band, and if there already exists the virtual address corresponding to the logical block address designated by the write command, the already existing virtual address is invalidated. The embodiment may include, further comprising the step of selecting only data written on a valid virtual address of the virtual band and executing rewriting based on the newly allocated virtual band.

In some embodiments a storage device may comprise: a storage medium for storing data; a storage medium interface for accessing the storage medium to write or read data; and a processor for controlling the storage medium interface to write data to the storage medium or read data from the storage medium, wherein the processor controls the storage medium interface to set a virtual zone such that a plurality of physical zones of the storage medium are integrated into a single virtual zone or a single physical zone is divided into a plurality of virtual zones, and to access storage medium based on the virtual zone. The embodiment may include, wherein the processor adjusts the size of a plurality of virtual bands allocated for each physical zone of the storage medium in response to a received command. The embodiment may include, wherein the processor converts a logical block address designated by a received command into a physical address of the storage medium by using the virtual zone. The embodiment may include, wherein the processor converts a logical block address designated by a write command into a physical address of the storage medium to sequentially write data in one direction on the storage medium by using the virtual zone. The embodiment may include, wherein the processor comprises: a first processor for extracting a logical block address designated by a received command; a second processor for converting the extracted logical block address into a virtual address based on the virtual zone; and a third processor for converting the converted virtual address into a physical address of the storage medium and controlling the storage medium interface to access the storage medium in response to the converted physical address. The embodiment may include, wherein the second processor executes a process for allocating a virtual band included in a virtual zone corresponding to a logical band including the extracted logical block address to the logical band and a process for converting the extracted logical block address into a virtual address based on the allocated virtual band. The embodiment may include, wherein, if there exists no virtual band allocated to the logical band including the extracted logical block address, the second processor allocates a new virtual band not allocated to other logical bands, among the virtual bands included in the virtual zone. The embodiment may include, wherein, if a virtual band having no writable address is allocated to the logical band including the extracted logical block address, the second processor allocates a new virtual band not allocated to other bands, among the virtual bands included in the virtual zone. The embodiment may include, wherein, if there exists no virtual band not allocated to other logical bands, among the virtual bands included in the physical zone corresponding to the logical band including the logical block address designated by the write command, the second processor allocates a virtual band not allocated to other logical bands included in other physical zones of the virtual zone to the logical band including the logical block address designated by the received command.

In some embodiments a computer system may comprise: a host device for issuing a command for operating a connected storage device; and a storage device for writing data transmitted from the host device to a storage medium or reading data from the storage medium based on the command issued from the host device, and transmitting the data to the host device, wherein, in the storage device, a virtual zone is set in response to a first command received from the host device such that a plurality of physical zones of the storage medium are integrated into a single virtual zone or a single physical zone is divided into a plurality of virtual zones, and the storage medium is accessed based on the virtual zone. The embodiment may include, wherein, in the storage device, the size of a plurality of virtual bands allocated for each physical zone of the storage medium is adjusted in response to a second command received from the host device.

In some embodiments a storage device parameter adjustment method may comprise: downloading a parameter adjustment program for a storage device from a terminal connected to a network; and executing the downloaded parameter adjustment program for the storage device, wherein the parameter adjustment program for the storage device comprises a code for executing a task of adjusting the first parameter value to determine the size of virtual zones such that a plurality of physical zones of a storage medium constituting the storage device is integrated into a single virtual zone or a single virtual zone is divided into a plurality of virtual zones or a code for executing a task of adjusting the second parameter value to determine the size of a plurality of virtual bands allocated for each physical zone of the storage medium.

The present invention can be realized as a method, an apparatus, a system and so on. When the present invention is realized as software, the members of the present invention are code segments which execute necessary operations. Programs or code segments may be stored in a processor readable medium. The processor readable medium may be any medium which can store or transmit information, such as an electronic circuit, a semiconductor memory device, a ROM, a flash memory, an EROM (Erasable ROM), a floppy disc, an optical disc, a hard disc, or the like.

Although the invention has been described with reference to particular embodiments, it will be apparent to one of ordinary skill in the art that modifications to the described embodiments may be made without departing from the spirit and scope of the invention. Therefore, it is obvious that the present invention is not restricted to the specific structures or arrangements shown or described in this specification.

What is claimed is:

1. An apparatus comprising:
   a data storage device including:
      a data storage medium having a plurality of physical zones, a physical zone including a first number of tracks and a first range of consecutive logical block addresses (LBAs);
      the first range of consecutive LBAs divided into a number of logical bands, each having a second range of consecutive LBAs from the first range;
      the first number of tracks apportioned among a number of physical bands, each having a second number of tracks and multiple writable sectors;
   a processor configured to:
      assign at least one physical band of a selected physical zone to a logical band of the selected physical zone in order to store data having specified LBAs within the second range of consecutive LBAs to the writable sectors of the at least one physical band;
      receive a virtual addressing adjustment command; and
      adjust a size of each of the physical bands relative to a size of the logical bands of the physical zone based on a first parameter of the virtual addressing adjustment command.

2. The apparatus of claim 1 further comprising:
   the number of physical bands of the selected physical zone exceeds the number of logical bands; and
   a storage capacity of the number of physical bands exceeds a size of the first range of consecutive LBAs.

3. The apparatus of claim 1 further comprising the virtual addressing adjustment command is received from a host external to the data storage device.

4. The apparatus of claim 2 further comprising the virtual addressing adjustment command is received based on user selection.

5. The apparatus of claim 1
   wherein the processor is further configured to:
      receive a write command including data having the specified LBAs; and
      store the data to the writable sectors of the physical band assigned to the logical band having the specified LBAs within the second range of consecutive LBAs of the logical band.

6. The apparatus of claim 1 wherein the processor is further configured to:
   receive a virtual zone creation command;
   configure at least one virtual zone mapped to at least one physical zone based on the virtual zone creation command, wherein a virtual zone includes a set of physical bands based on the mapped at least one physical zone; and
   access data on the data storage medium based on the at least one configured virtual zones.

7. The apparatus of claim 6, wherein the processor is further configured to:
   map a single virtual zone to multiple physical zones such that the single virtual zone includes the physical bands of the multiple physical zones;
   receive a write command for a specified LBA falling within the range of a specified logical band from one of the multiple physical zones; and
   assign any available physical band from the virtual zone to the specified logical band for storing data of the write command.

8. The apparatus of claim 6, wherein the processor is further configured to:
   map a plurality of virtual zones to a single physical zone such that each virtual zone includes a subset of the physical bands of the single physical zone.

9. The apparatus of claim 6, wherein the processor is further configured to:
   adjust a size parameter of at least one virtual zone based on a second parameter of the virtual addressing adjustment command.

10. The apparatus of claim 1, wherein adjusting the size of physical bands comprises decreasing the second number of tracks.

11. The apparatus of claim 1, wherein adjusting the size of physical bands comprises increasing the second number of tracks.

12. The apparatus of claim 1 wherein the first parameter of the virtual addressing adjustment command can direct that physical bands be made larger than the size of the logical bands, equal to the size of the logical bands, or smaller than the size of the logical bands.

13. The apparatus of claim 1, wherein the data storage medium includes writable tracks written in a shingled manner where a first track is partially overwritten by a second track.

14. A method comprising:
   providing a data storage device including a data storage medium having a plurality of physical zones, a physical zone including a first number of tracks and a first range of consecutive logical block addresses (LBAs);
   the first range of consecutive LBAs divided into a number of logical bands, each having a second range of consecutive LBAs from the first range;

the first number of tracks apportioned among a number of physical bands, each having a second number of tracks and multiple writable sectors;

assigning at least one physical band of a selected physical zone to a logical band of the selected physical zone in order to store data having specified LBAs within the second range of consecutive LBAs to the writable sectors of the at least one physical band;

receiving at the data storage device a virtual addressing adjustment command; and adjusting a size of each of the at least one physical bands relative to a size of the logical bands of the physical zone based on a first parameter of the virtual addressing adjustment command.

15. The method of claim 14, further comprising:
the number of physical bands of the selected physical zone exceeds the number of logical bands; and
a storage capacity of the number of physical bands exceeds a size of the first range of consecutive LBAs.

16. The method of claim 14 further comprising:
the virtual addressing adjustment command is received from a host external to the data storage device based on user selection.

17. The method of claim 14, further comprising:
receiving at the data storage device a virtual zone creation command;
configuring at least one virtual zone mapped to at least one physical zone based on the virtual zone creation command, wherein a virtual zone includes a set of physical bands based on the mapped at least one physical zone; and
accessing data on the data storage medium based on the at least one configured virtual zones.

18. The method of claim 17, further comprising:
mapping a single virtual zone to multiple physical zones such that the single virtual zone includes the physical bands of the multiple physical zones;
receiving a write command for a specified LBA falling within the range of a specified logical band from one of the multiple physical zones; and
assigning any available physical band from the virtual zone to the specified logical band for storing data of the write command.

19. The method of claim 17, further comprising mapping a plurality of virtual zones to a single physical zone such that each virtual zone includes a subset of the physical bands of the single physical zone.

20. The method of claim 17, further comprising:
adjusting a size parameter of at least one virtual zone based on a second parameter of the virtual addressing adjustment command.

* * * * *